US006804267B1

(12) United States Patent
Long et al.

(10) Patent No.: US 6,804,267 B1
(45) Date of Patent: Oct. 12, 2004

(54) TRANSCEIVER TRAINING FOR DSL MODEMS UNDER TCM-ISDN INTERFERENCE

(75) Inventors: Guozhu Long, Newark, CA (US); Yaron Bar-Ness, San Jose, CA (US)

(73) Assignee: Centillium Communications, Inc., Fremont, CA (US)

( * ) Notice: Subject to any disclaimer, the term of this patent is extended or adjusted under 35 U.S.C. 154(b) by 0 days.

(21) Appl. No.: 09/326,782

(22) Filed: Jun. 4, 1999

Related U.S. Application Data

(63) Continuation-in-part of application No. 08/958,763, filed on Oct. 25, 1997, now Pat. No. 5,991,311.

(51) Int. Cl.$^7$ .............................. H04J 3/22; H04J 4/00; H04B 3/20; H04L 5/16

(52) U.S. Cl. ....................... 370/524; 370/465; 370/478; 370/286; 375/219; 375/222; 375/225

(58) Field of Search ................................ 370/484, 478, 370/517, 521, 524, 465, 498, 286, 287, 290, 292; 379/242, 399, 417; 375/222, 229, 231, 220, 260, 225, 219

(56) References Cited

U.S. PATENT DOCUMENTS

| | | | |
|---|---|---|---|
| 4,956,851 A | 9/1990 | Wolensky et al. ............. 395/8 |
| 5,202,963 A | 4/1993 | Zelley ......................... 395/325 |
| 5,353,280 A | 10/1994 | Ungerböck ................. 370/32.1 |
| 5,410,343 A * | 4/1995 | Coddington et al. .......... 725/99 |
| 5,541,955 A | 7/1996 | Jacobsmeyer ............... 375/222 |
| 5,541,967 A | 7/1996 | Gluska et al. .............. 375/364 |
| 5,751,701 A | 5/1998 | Langberg et al. ........... 370/281 |
| 6,064,692 A * | 5/2000 | Chow .......................... 375/219 |
| 6,078,645 A * | 6/2000 | Cai et al. ....................... 379/3 |
| 6,219,378 B1 * | 4/2001 | Wu ............................. 375/231 |
| 6,252,901 B1 * | 6/2001 | Mueller et al. ............. 375/222 |
| 6,266,347 B1 * | 7/2001 | Amrany et al. ............. 370/478 |
| 6,272,170 B1 * | 8/2001 | Chu ............................ 375/222 |
| 6,307,889 B1 * | 10/2001 | Chun ......................... 375/260 |
| 6,389,062 B1 * | 5/2002 | Wu ............................. 375/222 |
| 6,393,051 B1 * | 5/2002 | Koizumi et al. ............ 375/220 |
| 6,426,946 B1 * | 7/2002 | Takagi et al. ............... 370/252 |
| 6,487,241 B1 * | 11/2002 | Cole .......................... 375/220 |
| 6,504,919 B1 * | 1/2003 | Takagi et al. .......... 379/100.17 |
| 6,510,184 B1 * | 1/2003 | Okamura .................... 375/260 |
| 6,580,752 B1 * | 6/2003 | Amrany et al. ............. 375/225 |
| 6,628,704 B1 * | 9/2003 | Long et al. ................. 375/219 |

OTHER PUBLICATIONS

Contact Person: Y. Okamura, "Proposed G.dmt ANNEX III, ADSL under TCM–ISDN noise enviroment", Feb. 9–20, 1998, pp. 2/9–9/9, 1/12–12/12, Source: NEC.

Contact Person: C. Hansen, "Draft New Recommendation G.992.2—Splitterless Asymmetric Digital Subscriber Line (ADSL) Transceivers—For Approval", ITU, Mar. 1999, pp. 1–185.

Contact Person: L. Brown, "Draft New Recommendatin G.994.1—Handshake Procedures for Digital Subscriber Line (DSL) Transceivers—For Approval", ITU, Mar. 1999. pp. 1–55.

* cited by examiner

*Primary Examiner*—Man Phan
(74) *Attorney, Agent, or Firm*—Fenwick & West LLP

(57) ABSTRACT

Transceiver training is optimized for xDSL modems operating in TCM-ISDN environments under NEXT and FEXT interference. Current ITU-T draft recommendations provide for dual bitmaps that are switched synchronized with the burst cycle of TCM-ISDN to provide a data stream having dual bit rates. These recommendations also provide for a single bitmap mode where the NEXT bit map is off. Prior to transceiver training, a modem does not know which mode has been selected. Transceiver training is optimized if the mode selection is known prior to transceiver training and the training signals are designed properly for the selected mode. To accomplish this, the mode selection is exchanged early in the modem initialization process, for example, during initial handshaking. By exchanging the mode selection earlier in the modem initialization process, the modem is able to improve transceiver training and configure properly for the type of data communication (e.g., full-duplex, half-duplex).

32 Claims, 14 Drawing Sheets

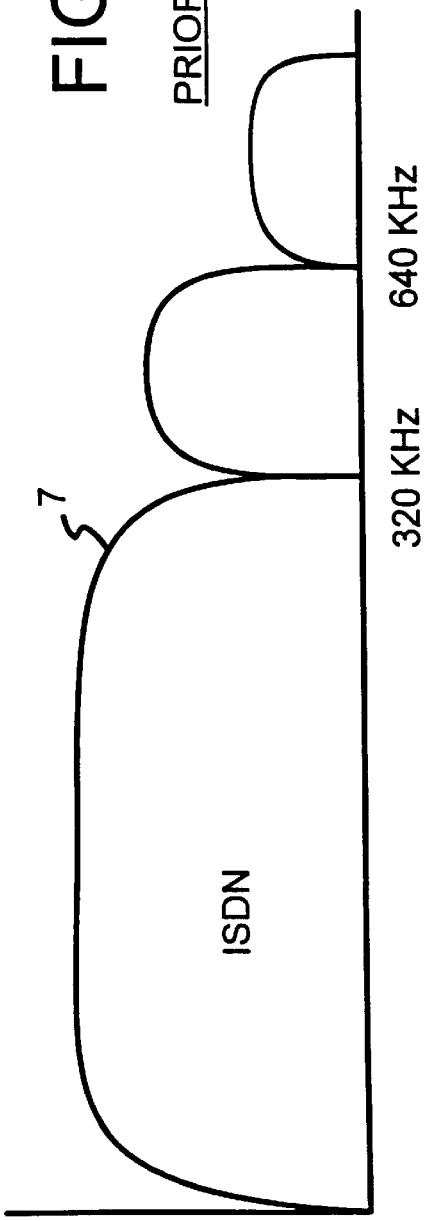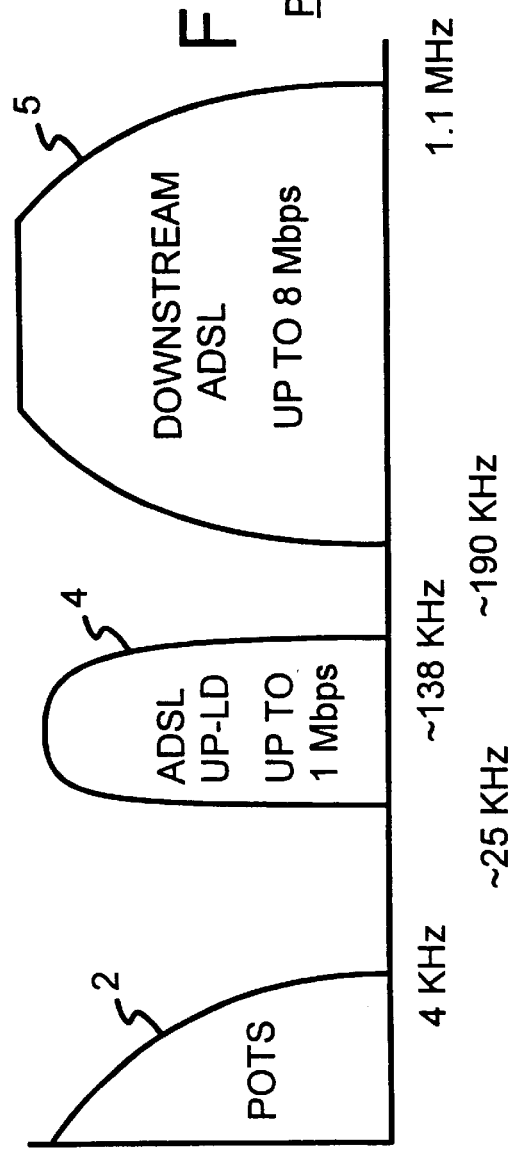

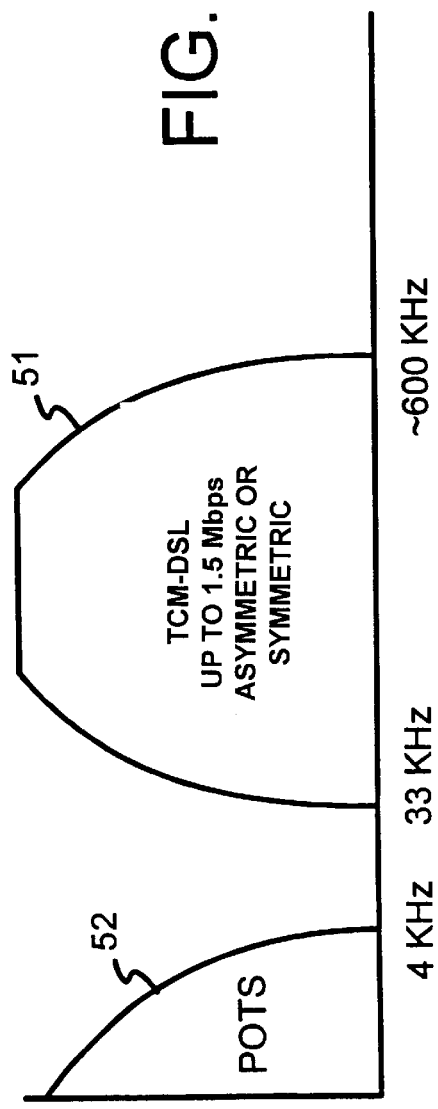
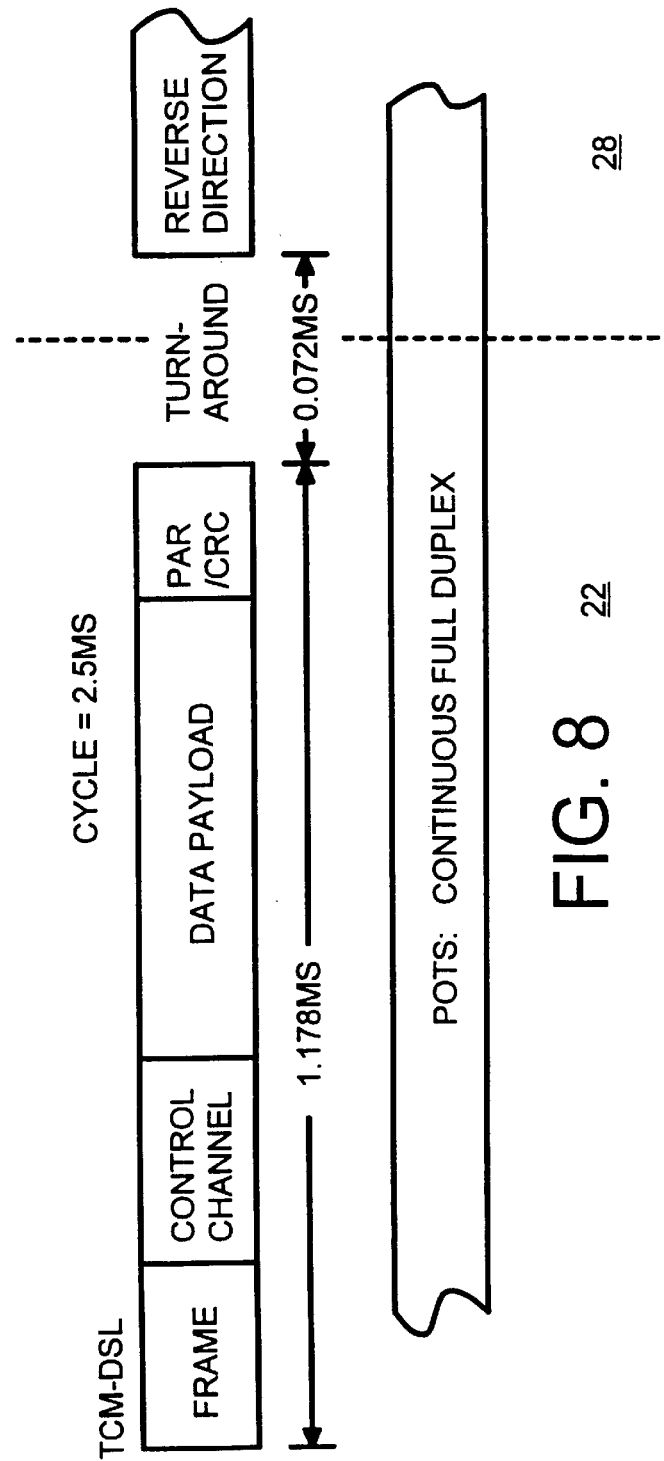

TRANSCEIVER TRAINING FOR DSL MODEMS UNDER TCM-ISDN INTERFERENCE

RELATED APPLICATION

This application is a continuation-in-part of U.S. application Ser. No. 08/958,763, filed on Oct. 25, 1997, now U.S. Pat. No. 5,991,311, which is incorporated by reference herein in its entirety.

FIELD OF THE INVENTION

This invention relates to Digital Subscriber Line (DSL) modems for communicating over telephone subscriber loops, and more particularly, to optimizing transceiver training for Time Compression Multiplexing DSL (TCM-DSL) modems.

BACKGROUND OF THE INVENTION

The demand for modem transmission speed continues to soar as more telephone customers in more countries send more data traffic over phone lines. While it is feasible to run high-speed fiber-optic cable to some new customers, existing customers are connected to the phone system by slower copper wires such as untwisted or twisted-pair lines. The cost of replacing all existing copper wires with higher-speed fiber-optic cable is prohibitive. Thus, higher-bandwidth technologies that use the existing copper-cable phone lines are desirable.

Basic rate Integrated Services Digital Network (ISDN) boosted data rates over existing copper phone lines to 128 kbps. Special termination and conditioning of the existing copper phone lines is required for ISDN.

DSL modems are now becoming available. Several variations of DSL technology (referred to generically as xDSL) are being explored, such as High Bit Rate DSL (HDSL), Rate Adaptive DSL (RADSL), Very High Bit Rate DSL (VDSL), and Asymmetric DSL (ADSL). ADSL is particularly attractive for consumer Internet applications where most of the data traffic is downloaded to the customer. Upstream bandwidth for uploading data can be reduced to increase downstream bandwidth since most Internet traffic is downstream traffic. ADSL provides a bandwidth of up to 8 Mbps in the downstream direction, or up to 2 Mbps if symmetric DSL is used. See, for example, U.S. Pat. Nos. 5,461,616, 5,534,912, and 5,410,343 for descriptions of ADSL technology.

Cross-talk Using Pulp Cables Limits xDSL

The wider bandwidth required for xDSL transmission creates higher cross-talk interference among copper pairs in the same cable-binder group. The level of the cross-talk varies for different cable structures and materials. In particular, some countries such as Japan and Korea use telephone cables with a paper-based "pulp" insulator rather than the plastic-insulated cables (PIC) used in the United States. These pulp cables produce much more cross-talk interference than the PIC cables. Thus, it is more difficult to deploy wide-band xDSL services in those countries since their existing telephone cables are prone to cross-talk interference.

FIG. 1 shows the problem of interference from existing ISDN lines. Central Office 8 (CO) contains several ISDN line cards 14 that connect the telephone network backbone to local lines 20 that are strung to the customer premises equipment (CPE). Remote ISDN terminal adapters or modems 12 are located at different remote customer sites within a few kilometers of central office 8.

Local lines from ISDN line cards 14 to remote ISDN modems 12 are usually routed through one or more cable bundles 18. These telephone-cable bundles 18 may contain dozens or more separate telephone lines or copper pairs. Standard voice services, ISDN services, and newer xDSL services often must share the same cable bundle. Since lines run close to other lines in cable bundles 18 for long distances, mutual inductances can create cross-talk interference or noise on lines 20.

For voice services such as Plain-Old-Telephone Service (POTS), the frequencies are low, so interference is negligible. ISDN digital services use a higher bandwidth of around 80 to 320 kHz. Interference begins to cause problems at ISDN frequencies. New xDSL services usually use even higher bandwidths. For example, ADSL bandwidths are usually above 1 MHz and have significant cross-talk problems. Cross-talk from other digital services such as older ISDN and T1 in a cable bundle can severely restrict xDSL speeds.

Due to different cross-talk interference characteristics, different line codes are used for basic rate ISDN. In countries such as the U.S., where better-insulated PIC cables are used, full-duplex data transmission with echo cancellation is deployed. Echo cancellation by the receivers removes the echo by the locally-transmitted signal so that the remotely transmitted signal can be received. Thus, both ends of the line can transmit simultaneously. Full-duplex data transmission with echo cancellation is described in International Telecommunication Union-Telecommunication Standardization sector (ITU-T) G.961, Appendix II, or T1.601, which is incorporated by reference herein in its entirety.

Japan Uses Half-Duplex ISDN

In countries such as Japan, where the noisy pulp cables are installed, a different ISDN system is often deployed. To eliminate the near-end cross-talk (NEXT) interference, TCM-ISDN is used rather than echo cancellation full-duplex. In such a system, the ISDN line cards at the CO are synchronized so that they all transmit at the same time. The ISDN line cards all receive during a different time period. Thus, NEXT interference during reception is eliminated since none of the other ISDN modems at the same side are transmitting during the reception time period. Although far-end-cross-talk (FEXT) interference exists, it is usually much weaker than NEXT. TCM-ISDN service is described in ITU-T G.961, Appendix III, which is incorporated by reference herein in its entirety.

FIG. 2 is a timing diagram for a TCM-ISDN line. During time period or window 22, data is output from the CO to the remote ISDN modem at the customer premises. This data arrives at the remote modem after a delay, during reception window 24. The customer premises ISDN equipment uses a burst clock detector to determine the timing of the receive downstream burst and to generate the timing for its transmit upstream burst. A pause occurs when no data is transmitted. This pause is sometimes called the turnaround period. During period 26, upstream data is transmitted from the remote modem to the CO, which arrives at the CO after a delay, during window 28.

At any particular time, only one end of the TCM-ISDN line is transmitting, while the other end is receiving. Echo cancellation is not needed since the echo of the transmitted signal does not have to be removed. Since each side transmits in slightly less than half of the time, the data rate during transmission has to be approximately doubled to obtain the same average data rate. This translates to a higher frequency bandwidth, which in turn creates more cross-talk. While such a TCM-ISDN system is effective for reducing crosstalk in the TCM-ISDN system itself, it is difficult to add newer xDSL systems in the same cable bundle because of the cross-talk from the ISDN lines.

Synchronized ISDN Lines Create Interference for xDSL

Newer xDSL services, such as HDSL and ADSL, use full-duplex transmission based on frequency-division-multiplexing (FDM) or echo cancellation. Therefore, the receiver at either side receives all the time. If such an xDSL modem is installed in the same cable bundle as the TCM-ISDN, the strong NEXT during the transmission time for the same-side TCM-ISDN modems will severely affect the reception of the xDSL signal.

FIG. 3 is a diagram of interference at a CO from several ISDN lines transmitting in synchronization. During transmit window 22, a burst of data is sent from the CO to the remote sites. NEXT is particularly strong during transmit window 22, since the ISDN devices at the CO are all transmitting. During receive time window 28, these ISDN devices at the CO are not transmitting. Interference is primarily FEXT, which is weaker than NEXT since it is attenuated by the length of the telephone line.

TCM-ISDN Transmitters Often Poorly Filtered—FIG. 4

FIG. 4 is a transmitting-signal spectrum of a TCM-ISDN modem. For background information on a TCM-ISDN telephone system, see U.S. Pat. No. 5,265,088 by Takigawa et al., and assigned to Fujitsu Ltd. and Nippon Telegraph and Telephone Corp. (NTT). This coding scheme uses Pulse Amplitude Modulation (PAM) with alternate-mark inversion (AMI). In this scheme, a binary zero is represented by no pulse, and a binary one by a positive or a negative pulse. Each symbol carries only one bit. The ISDN lines are designed to operate over a frequency range of zero (Direct Current or D.C.) to about 320 kHz. Since ISDN operates down to 0 Hz, no lower band is available for POTS voice calls.

ISDN signals decay slowly above 320 kHz. The higher harmonics are not necessary to carry information, but they are often not filtered by the transmitter to a low level, resulting in long, high frequency tail. When ISDN was first deployed, the upper frequencies were not used by other devices, so interference in the higher bands was not a problem. However, it is a severe problem for newer xDSL services that use the higher frequency band.

ISDN Interferes With xDSL—FIG. 5A

Interference from ISDN is generated in these frequency bands used by ADSL and other forms of xDSL, and vice versa. Lower-quality cables such as pulp cables do not sufficiently insulate ISDN lines from ADSL lines.

Full-duplex xDSL Data Transmission—FIG. 15

Annex C of ITU-T recommendations G.992.1 and G.992.2 (hereinafter also referred to as "Annex C"), which is incorporated by reference herein in its entirety, defines specific requirements for TCM-DSL modems operating in TCM-ISDN environments. More particularly, Annex C defines a Dual Bitmap (DBM) encoding method for providing dual bitmaps that are switched synchronized with the burst cycle of TCM-ISDN to provide a data stream having dual bit rates. The method is based on the observation that for short local loops (e.g., less than about two kilometers), the channel signal-to-noise ratio (SNR) can be sufficiently high during NEXT interference to transmit data at a low bit rate. Thus, under certain conditions DBM allows full-duplex operation of TCM-DSL modems by employing different bit rates under NEXT and FEXT interference, respectively.

Referring to FIG. 15, there is shown a diagram illustrating full-duplex xDSL data transmission using DBM encoding. During upstream (US) NEXT time 1500 (which is downstream (DS) FEXT time), a CO modem 47 (FIG. 9) transmits data at a downstream bit rate 1504 and receives data at an upstream bit rate 1508, wherein the upstream bit rate 1508 may be significantly lower than the upstream bit rate 1510. During this same time period, a CPE modem 48 (FIG. 9) transmits data at the upstream bit rate 1508 and receives data at the downstream bit rate 1504. During US FEXT time 1502 (DS NEXT time), the CO modem 47 transmits data at the downstream bit rate 1506 and receives data at the upstream bit rate 1510, wherein the downstream bit rate 1506 may be significantly lower than the downstream bit rate 1504. During this same time period, the CPE modem 48 transmits data at the upstream bit rate 1510 and receives data at the downstream bit rate 1506.

The DBM encoding method described above typically works for short local loops (e.g., less than about two km). For longer local loops, however, the SNR during NEXT time (1500 for US, 1502 for DS) is typically too low for modems to send any data. In that case, the data transmission occurs only in FEXT time (1500 for DS, 1502 for US). This is referred to as "Single Bitmap" encoding (SBM), which is a special case of DBM encoding. With SBM, the CO and CPE modems 47, 48, are transmitting only in FEXT time 1500 and 1502, respectively, and do not transmit simultaneously (i.e., half-duplex mode).

In DBM encoding, bit rates can be changed by changing the bitmaps used to encode the symbols to be transmitted. As is understood by those skilled in the art, a "bitmap" determines the number of bits which can be encoded into a symbol. A "symbol" is the basic unit of information transmitted by the modem. The number of bits encoded into each symbol is limited by the quality of the communication channel. The quality of the communication channel can be represented by its SNR. Thus, a system employing DBM includes at least two bit maps for providing different data rates for NEXT time and FEXT time, respectively.

In order for modems to transmit and receive data, it is important that the modems are properly initialized. According to ITU-T draft recommendations G.992.1 and G.992.2 (October, 1998), the initialization includes the following four phases: (1) initial handshaking, (2) transceiver training, (3) channel measurement, and (4) message exchange. The initial handshaking phase is defined in ITU-T recommendation G.994, which is incorporated by reference herein in its entirety.

In the current version of G.992.1 and G.992.2, the transceiver training is done in half-duplex mode, i.e., all the training signals are sent only in FEXT time (1500 for DS, 1502 for US). At the end of the transceiver training, the CO modem 47 informs the CPE modem 48 whether DBM or SBM will be used. Depending on the mode (DBM or SBM), the transceiver training could be optimized for the selected mode.

For DBM operation, the CO and CPE modems 47,48 transmit continuously in full-duplex mode. If operating in full-duplex mode, an echo signal from the CPE modem 48 transmitter is added to a remote signal received from the CO modem 47. This combined signal is often stronger than the remote signal by itself. To accommodate both signals, the CPE modem 48 receiver adjusts its gain and dynamic range. Moreover, the CPE modem 48 receiver may employ an echo canceller or echo filter to remove the unwanted echo signal generated by the CPE modem 48 transmitter.

By contrast, when operating in the SBM mode the echo signal and the remote signal are not received by the CPE modem 48 at the same time. At any particular time, one end of the TCM-ISDN line is transmitting, while the other end is receiving (e.g., half-duplex). Therefore, no gain adjustment due to echo or echo canceller is needed while operating in the SBM mode.

A problem, however, arises if the CPE modem 48 trains with SBM encoded signals, then subsequently transmits xDSL data using DBM, and vice-versa. To properly train TCM-DSL modems for full-duplex communication, the training signals should be full-duplex. Similarly, to properly train TCM-DSL modems for half-duplex communication, the training signals should be half-duplex. Thus, to train a TCM-DSL modem properly requires knowledge of the mode of communication (e.g., SBM or DBM) prior to training. Unfortunately, existing systems do not provide such information, as described in detail below.

During the initialization of such a CPE modem, the CPE modem does not know if it will be using SBM or DBM until after transceiver training has completed. Therefore, its receiver must allocate additional dynamic range for the echo signal in case DBM is selected. This added dynamic range is wasted, however, if SBM is selected instead of DBM. Further, since the echo signal and the remote signal are typically not received at the same time during transceiver training, the dynamic range of the CPE modem receiver cannot be preset to accommodate the combined signal. Thus, if the training signal used in SBM is half-duplex, the transceiver training will not be optimized for full-duplex data transmission in DBM, and vice versa.

Additionally, to remove echo from the remote signal during DBM operation, a different frequency band is allocated for upstream and downstream communication which is typically achieved with either echo filters or echo cancellers. Echo filters typically employ a guard band to prevent cross-talk interference. Unfortunately, the guard band reduces the available frequency bandwidth for data transmission. Echo cancellers do not need a guard band but are more complicated to implement.

Neither echo filters nor echo cancellers are needed for SBM mode. Hence, the TCM-DSL system configuration should be optimized based on the mode selected (DBM/SBM) to provide a wider bandwidth for data communication due to the elimination of echo filters and associated guard bands.

Accordingly, there is a need for an xDSL system that can be added to an existing telephone cable system where TCM-ISDN services co-exist with new xDSL services in a common cable bundle. It is desired that a DBM encoding scheme be incorporated in the xDSL system in a manner that allows TCM-DSL modems to optimize for full-duplex or half-duplex communication during transceiver training.

SUMMARY OF THE INVENTION

The present invention is directed to improving transceiver training in TCM-DSL modems operating under NEXT and FEXT interference. Current ITU-T draft recommendations (October, 1998) provide for dual bitmaps that are switched synchronized with the burst cycle of TCM-ISDN to provide a data stream having dual bit rates. These recommendations also provide for a single bitmap mode having a single bit rate only in FEXT time with the bitmap for NEXT time turned off. With systems and methods defined in ITU-T draft recommendations (October, 1998), a modem does not know which mode has been selected prior to transceiver training, which results in less than optimal transceiver training and modem configuration. In the present invention, mode selection is exchanged between modems prior to transceiver training (e.g., during initial handshaking). By exchanging the mode selection prior to transceiver training, the transceiver training is improved and the modems are configured properly for the type of data transmission (e.g., full-duplex, half-duplex).

A method of training modems for DSL systems under TCM-ISDN interference comprises the steps of: exchanging between a first modem and a second modem a mode selection prior to transceiver training; providing full-duplex communication between the first and second modems if a first mode is selected; and providing half-duplex communication between the first and second modems if a second mode is selected.

A system for training modem transceivers for DSL systems under TCM-ISDN interference includes a first modem coupled to a telephone line. The first modem includes an encoder for encoding data. A map switch is coupled to the encoder for selecting one or more bitmaps for encoding based on a mode selected prior to transceiver training. A second modem coupled to the telephone line includes a decoder for decoding data transmitted by the first modem and a map switch coupled to the decoder for selecting one or more bitmaps for decoding based on the mode selected prior to transceiver training.

The present invention provides advantages over the prior art systems and methods by enabling TCM-DSL modems to optimize transceiver training and configuration under TCM-ISDN interference. The optimization includes, for example, adjusting the dynamic range of the modem receiver to accommodate echo signals generated by the modem local transmitter during full-duplex operation, and to adjust the modem transceiver configuration to optimize the usage of available frequency bandwidth.

BRIEF DESCRIPTION OF THE DRAWINGS

FIG. 4 is a transmitting-signal spectrum of a TCM ISDN modem.

FIG. 5 is a diagram of the partitioning of frequency bands for ADSL (TI.413) service using frequency-division duplex and voice calls.

FIG. 7 is a frequency spectrum for TCM-DSL.

FIG. 8 is a diagram of framed TCM-DSL data for TCM.

DETAILED DESCRIPTION OF THE PREFERRED EMBODIMENTS

The present invention relates to an improvement for high speed modems in telephone systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

TCM-DSL

The inventors have realized that, although unusual, a TCM scheme can be used with xDSL. TCM is not used with existing xDSL systems, perhaps because the required bandwidth is more than doubled compared with full-duplex. TCM requires that the data be compressed into a transmit period of slightly less than half the overall cycle time. Full-duplex with echo cancellation, or FDM has been the exclusive method for xDSL systems and ISDN in the United States and many other countries.

No NEXT Interference During TCM-ISDN Receive Periods

Although wider bandwidth is necessary for TCM, interference with other lines can be reduced. Simply using TCM for xDSL lines is not necessarily a benefit in itself. However, the inventors realize that when TCM is used for xDSL, which has to be installed on cables with high cross-talk and to coexist with the TCM-ISDN, the xDSL line's transmit and receive periods can be synchronized with the older TCM-ISDN transmit and receive windows 22,28.

Since the TCM-ISDN modems stop transmitting during their receive windows, there is no NEXT interference from the older TCM-ISDN lines during the receive windows. Furthermore, when all these new xDSL modems are synchronized, there is no self NEXT interference (NEXT from the same xDSL on other pairs in the cable bundle). Thus, the newer xDSL equipment can receive without TCM-ISDN NEXT interference and self NEXT during these receive windows. The problem of severe NEXT interference is eliminated.

TCM-DSL Synchronized to TCM-ISDN

In countries where pulp cables are used, TCM-ISDN is a good alternative over echo cancellation ISDN due to the high cross-talk. A typical example is in Japan. Other countries that also use pulp-insulated cables or TCM-ISDN may also benefit from TCM-DSL.

Figure 6:
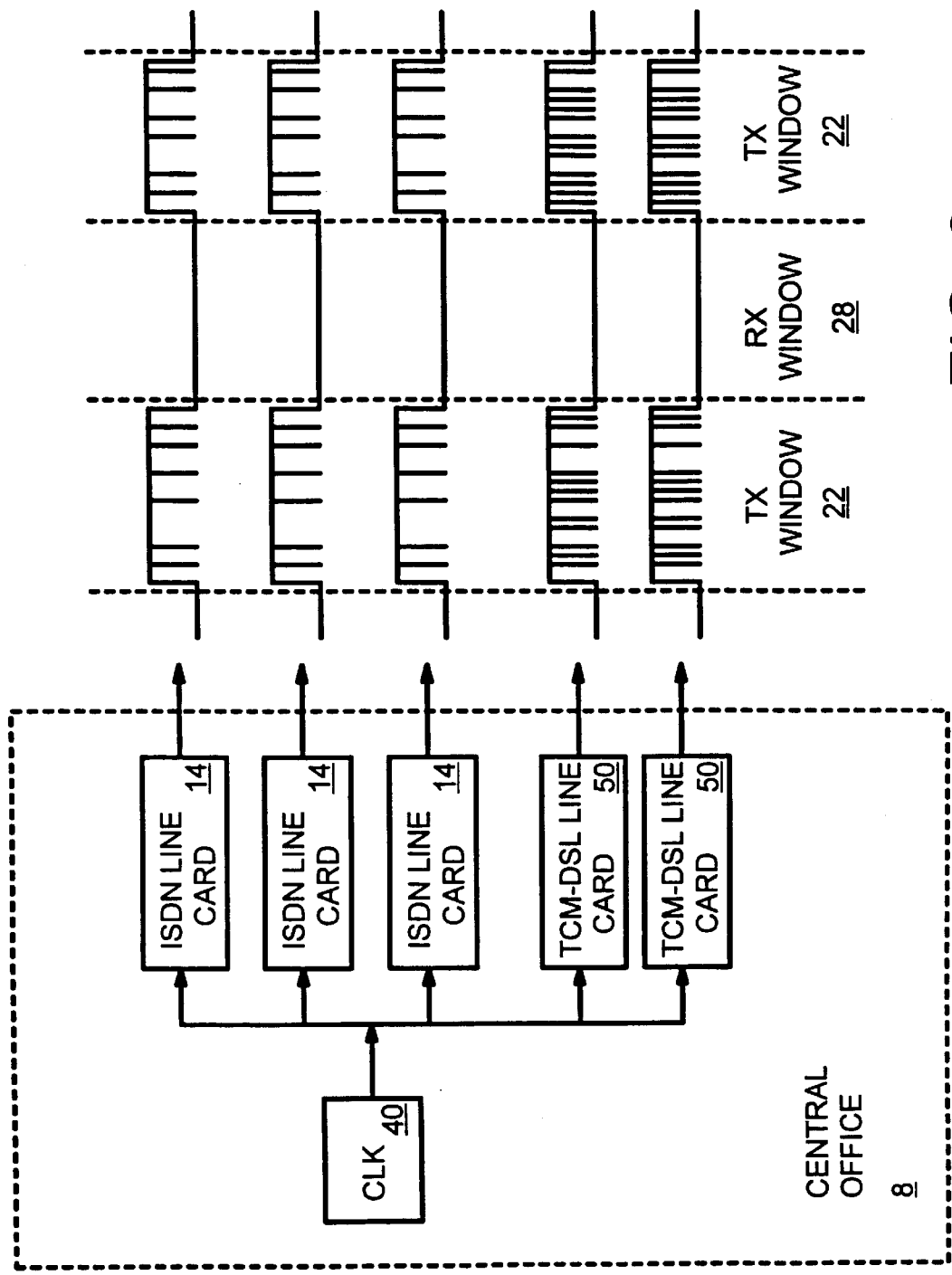
FIG. 6 is a diagram of a TCM-DSL line card synchronized to TCM-ISDN line cards in a central office.

FIG. 6 is a diagram of a TCM-DSL line card synchronized to TCM-ISDN line cards in a CO. Central office 8 contains several ISDN line cards 14 that use TCM to transmit and receive during time windows 22, 28, respectively. ISDN line cards 14 are synchronized by clock 40 to all transmit at the same time and to all receive at the same time. Thus, all ISDN line cards transmit during one phase of clock 40 but stop transmitting and receive during the other phase of clock 40.

Clock 40 is also routed to TCM-DSL line card 50. Clock 40 synchronizes TCM-DSL line card 50 so that it also transmits during transmit window 22 but receives during receive window 28. Since ISDN line cards cease transmitting during receive window 28, there is no NEXT interference from ISDN line cards 14 and other TCM-DSL line cards 50 during receive window 28.

NEXT Interference from ISDN line cards 14 and other TCM-DSL line cards 50 during transmit window 22 is significant. However, TCM-DSL line card 50 is also transmitting during transmit window 22, and not receiving. Therefore the strong NEXT interference is ignored by the receiver. Although FEXT still exists when TCM-DSL is receiving, it is attenuated by the length of the telephone line. Thus, FEXT is not as severe as NEXT. The invention eliminates the mechanism for NEXT, leaving FEXT and loop attenuation as the performance-limiting factors.

TCM-DSL line card 50 uses more advanced modulation techniques to encode more than one bit per symbol. Thus TCM-DSL line card achieves a higher data rate than ISDN line cards 14. More data is transmitted by TCM-DSL line card 50 than by ISDN line cards 14 during each transmit window 22.

Pass-band for TCM-DSL—FIG. 7

FIG. 7 is a frequency spectrum for TCM-DSL. TCM-ISDN uses an AMI line code that occupies a wide frequency range. Even the low frequencies down to D.C. are occupied by ISDN, preventing standard voice calls from simultaneously using the telephone lines. In contrast, TCM-DSL uses a pass-band coding technique that does not transmit energy in the voice band. This allows voice calls or voice-band modems to simultaneously use the telephone line.

Standard telephone equipment is used to carry voice calls over the low-frequency POTS band 52. POTS band 52 occupies frequencies from 0 to 4 kHz, which includes most of the range for human voice and hearing. At the same time, TCM-DSL data is carried over a higher-frequency pass-band 51. Pass-band 51 occupies frequencies of about 30 kHz to as much as 500 kHz, although the band can be varied somewhat.

TCM-DSL Framing with Continuous POTS—FIG. 8

FIG. 8 is a diagram of framed TCM-DSL data for TCM. TCM-DSL's transmitting and receiving windows are synchronized with TCM-ISDN transmit and receive windows 22, 28. Therefore, the framing structure of TCM-DSL is similar to that of TCM-ISDN. The CO side TCM-DSL transmits signals for 1.178 milliseconds during transmit window 22.

After the CPE modem receives the end of the transmit window 22, there is a short turn-around period before the CPE modem starts to transmit. This turn-around period is about 0.02 ms for TCM-ISDN systems, which is matched by the TCM-DSL line cards. Then the remote modem at the customer premises transmits during receive window 28. Since the ISDN line cards are also receiving at that time, there is no NEXT cross-talk at the CO. The process repeats with a period of 2.5 ms.

While the TCM-DSL data is synchronized with the ISDN timing, voice analog signals are continuously transmitted and received at both ends of the telephone line. The POTS band operates continuously in full-duplex. Voice can be both transmitted and received during both transmit window 22 and receive window 28 simultaneously with the TCM-DSL signal, since separate frequency bands are used for POTS and TCM-DSL.

TCM-DSL Equipment Includes Frequency Splitter

Figure 9:
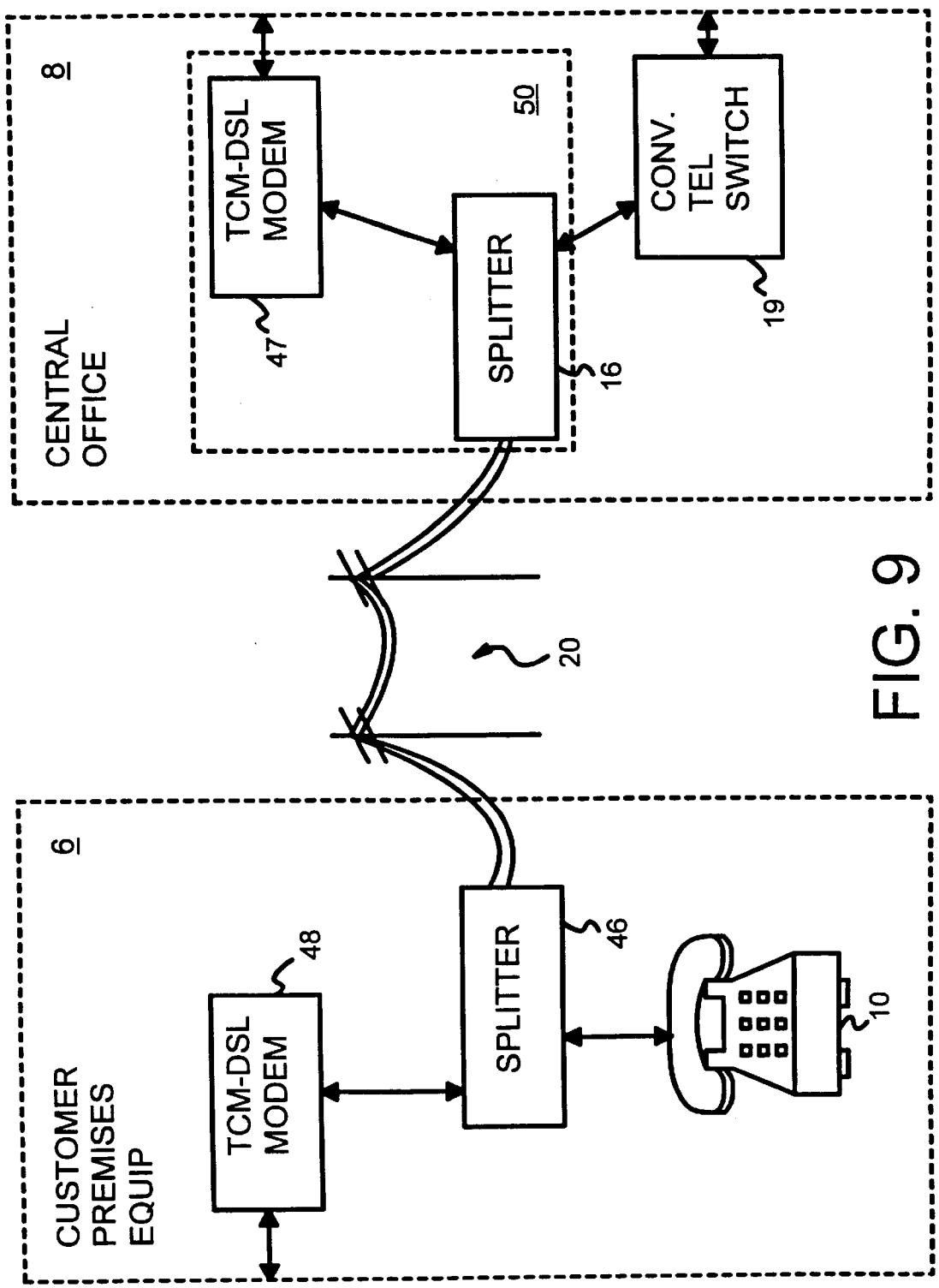
FIG. 9 is a diagram of a TCM-DSL phone line highlighting the frequency splitters.

Special equipment is needed at both the customer premises and at the phone company's CO where the customer's copper phone line ends. FIG. 9 is a diagram of a TCM-DSL phone line highlighting the frequency splatters.

Copper phone line 20 is a pair of copper wires running from central office 8 to the customer. The phone customer has installed customer premises equipment 6. Since TCM-DSL uses high frequencies for data traffic and POTS uses low frequencies for voice calls, the signal received over POTS phone line 20 must be split into high and low frequency components. Splitter 46 contains a low-pass filter that outputs the low frequency components from copper phone line 20. These low frequency components carry the voice calls that are sent to telephone set 10. Telephone set 10 is a standard POTS analog telephone set. Additional phone sets, fax machines, or voice band modem equipment can be connected to telephone set 10 as phone line extensions, as is well-known.

Splitter 46 also contains a high-pass filter that outputs the high-frequency components to FCM-DSL modem 48. TCM-DSL modem 48 receives the high-frequency analog signal from splitter 46 and converts it to downstream digital data during the receiving window 28. During the transmitting window 22, it converts the upstream data into high-frequency analog signal. Splitter 46 mixes this high-frequency analog signal from TCM-DSL modem 48 with the low frequency voice from telephone set 10 and transmits the combined signal over copper phone line 20 to central office 8.

Central office 8 receives copper phone line 20 and splits off the high-frequency components with splitter 16. The high frequency components from splitter 16 are sent to TCM-DSL modem 47, which converts the analog high frequency signal to an upstream digital data. TCM-DSL line card 50 shown in FIG. 6 includes TCM-DSL modem 47 and, in some embodiments, splitter 16. The data stream can then be connected to a high-speed data highway or backbone.

Splitter 16 sends low-frequency components to conventional telephone switch 19, which includes a line card similar to conventional line cards that terminate POTS lines. Conventional telephone switch 19 connects this voice call to remote voice-band equipment such as a telephone set.

Incoming voice calls received by conventional telephone switch 19 are combined by splitter 16 with high-frequency data traffic from TCM-DSL modem 47. The combined signal is transmitted over copper phone line 20 to customer premises equipment 6.

Figure 10:
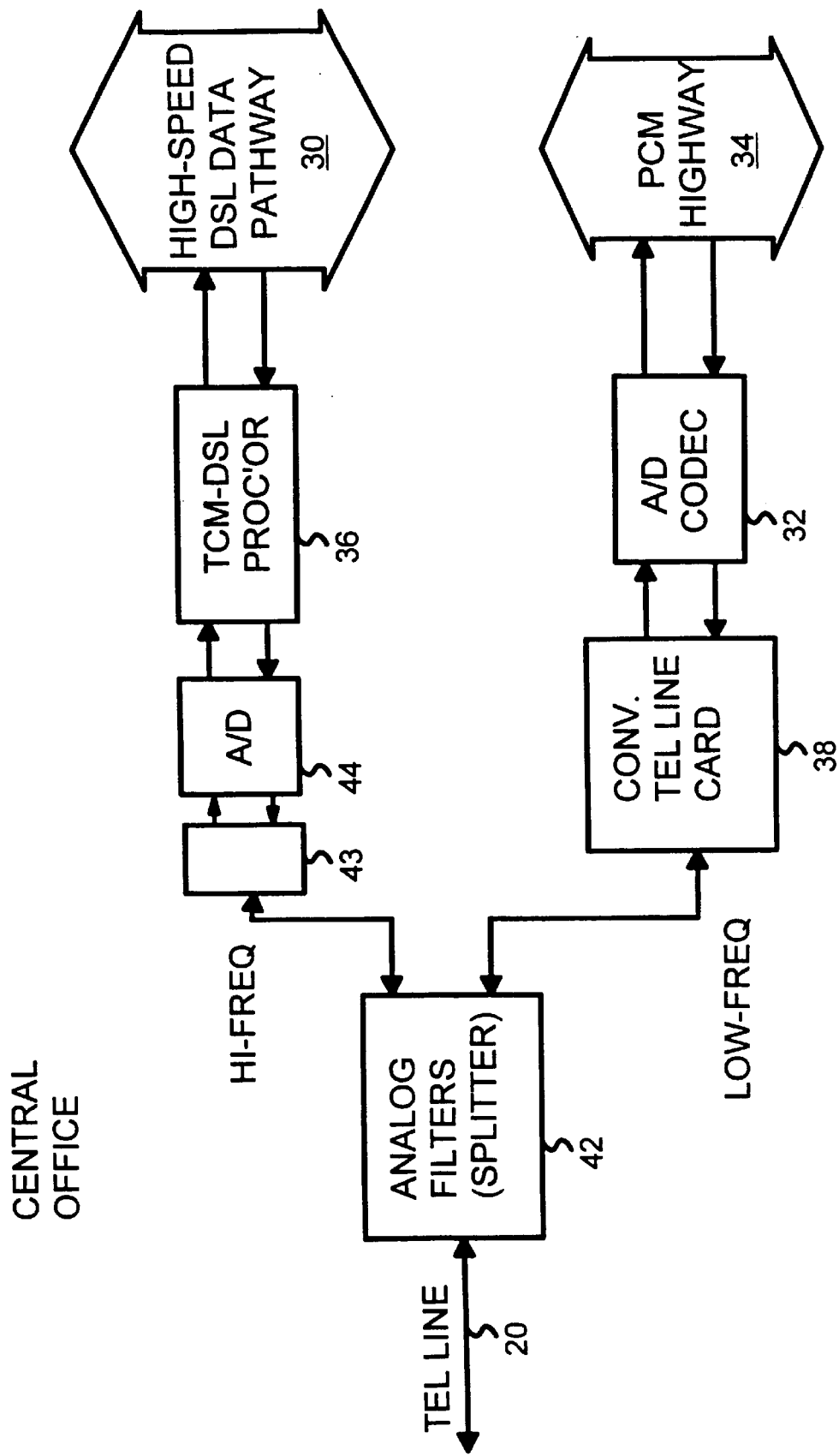
FIG. 10 is a diagram of TCM-DSL line equipment at a central office.

TCM-DSL at Central Office—FIG. 10

FIG. 10 is a diagram of TCM-DSL line equipment at a CO. Copper phone line 20 is received at the CO by POTS splitter 42. POTS splitter 42 uses transformers or inductor coils together with resistors and capacitors to form high-pass and low-pass filters. The output of the high-pass filter in POTS splitter 42 is the high frequency TCM-DSL signal, which is sent to analog-digital A/D converter 44. A/D converter 44 converts the analog signal from POTS splitter 42 to digital values at a high sampling rate. These digital values are sent to TCM-DSL processor 36, which extracts the encoded data values transmitted from the TCM-DSL modem at the customer premises. The TCM-DSL processor 36 is coupled to a memory (not shown) for storing instructions to be executed by the TCM-DSL processor 36.

The data from TCM-DSL processor 36 is combined with other data for transmission over a shared high speed data pathway 30. High-speed data pathway 30 can be a fiber-optic backbone or other high-bandwidth network. TCM-DSL processor 36 also receives data from high-speed data pathway 30 and encodes the data. The encoded data is then converted to analog signals by A/D converter 44, and the resulting analog waveform is sent to POTS splitter 42, where it is combined with the low frequency voice signal and transmitted to the customer's premises over phone line 20.

The low frequency components output from the low-pass filter in POTS splitter 42 are sent to conventional telephone line card 38, which is a standard line card used to terminate POTS phone lines. The receiving and transmitting signals are separated by a hybrid circuit 43 on the telephone line card. The analog signals from conventional telephone line card 38 are converted to digital values and encoded as Pulse Code Modulation ("PCM") signals by Coder/Decoder 32 ("CODEC 32"). The PCM signals from CODEC 32 are combined with signals from other line cards (not shown) and transmitted over PCM highway to other central offices, or to a long-distance network.

Incoming voice calls from PCM highway 34 are decoded and converted to analog-waveforms by CODEC 32. The analog waveforms are driven by conventional telephone line card 38 and then mixed with the high-speed TCM-DSL data by POTS splitter 42 and transmitted out on copper phone line 20.

Figure 11:
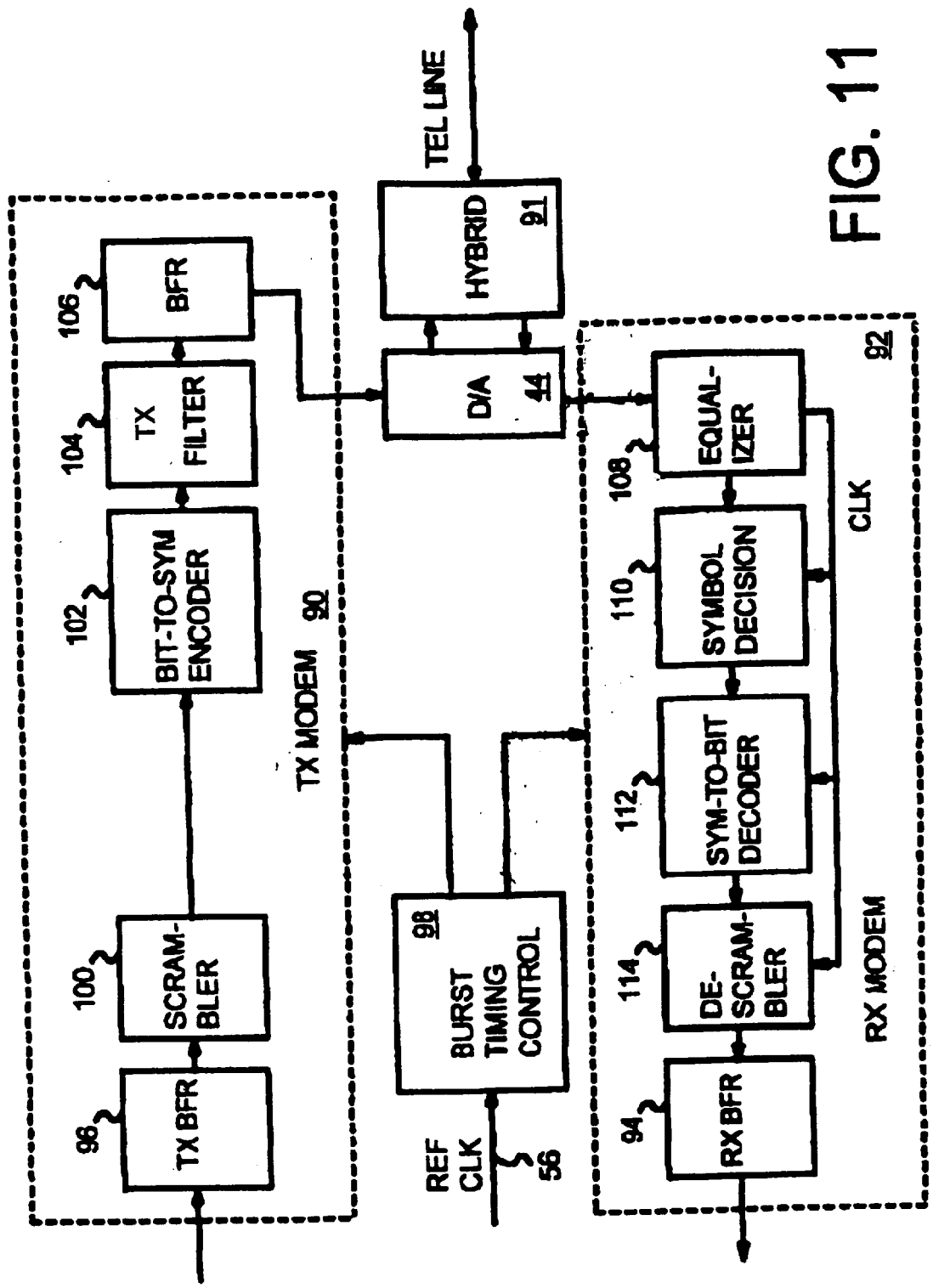
FIG. 11 is a diagram of a TCM-DSL modem.

TCM-DSL Modem—FIG. 11

FIG. 11 is a diagram of a TCM-DSL modem. One or more of the functions shown in FIG. 11 may be implemented in, for example, DSP 36, as previously described above. This modem can be used either at the customer premises or at the CO. The CO implementation is shown in the example. Hybrid circuit 91 performs 2-to-4-wire conversion, which converts the bi-directional two-wire transmission into two pairs of one-directional transmissions. One pair is for receiving and one is for transmitting. Analog front-end 44 includes an analog-to-digital ("A/D") converter and a digital-to-analog ("D/A") converter. The separated, filtered signal converted by analog front-end 44 from analog to digital is sent to modem receiver 92, while the output from modem transmitter 90 is converted from digital to analog by the D/A converter in analog front-end 44 and sent to hybrid circuit 91.

Modem receiver 92 includes digital equalizer 108 for correcting the distortions caused by the line's frequency response. There may be different modes to control the modem clock. In one mode, the CO modem synchronizes its clock to the network clock. In another mode, each modem's receiver synchronizes its clock to the remote modem's transmitter clock. In that mode, clock recovery with equalizer 108 recreates the timing of the remote transmitter. A two stage approach may be used for clock recovery: the clock adapts quickly when the start-frame sequence begins, while a slowly-adapting clock is used for the remainder of the data burst.

Symbol decision block 110 detects the symbols from the data stream. The actual structure of symbol decision block 110 may vary depending on the encoding scheme used by the remote transmitter. For the uncoded system, symbol decision block 110 may be just a slicer. For a Trellis-code modulation system, a Viterbi decoder is often used for block 110 to improve the reliability of the decision. Since each symbol can encode a series of bits, symbol-to-bit decoder 112 converts the symbols to binary bits. Descrambler 114 restores the bits to their original value before they were scrambled by the transmit scrambler. The descrambled bit stream is buffered by receive buffer 94 before being sent to the high-speed data pathway at the CO, or to the customer's data terminal equipment.

Data ready for transmission is received from the customer's data terminal equipment or the telephone network's data pathways and buffered by transmit buffer 96. Transmit buffer 96 and receive buffer 94 are especially necessary when the data is continuous, while the TCM-DSL modem bursts data using time compression.

Scrambler 100 in transmit modem 90 operates on the input data bits, in order to randomize the data pattern. Symbol encoder 102 receives sequences of bits from buffer 96 and encodes them as symbols in the signal constellation. If carrierless amplitude/phase modulation (CAP) is used, a two-dimensional constellation is used where each signal point in the constellation has an in-phase component and a quadrature component. Such a two dimensional signal constellation is the same as the one used by the well-known Quadrature Amplitude Modulation (QAM), where both the pulse amplitude and the phase carry data information. Depending on the constellation size, each symbol carries multiple bits. For example, 64-CAP has 64 points in the constellation, meaning that each symbol may carry six binary bits. An even bigger constellation may be used to carry more bits per symbol.

As an example, Using 64-CAP and a 500 kbaud symbol rate, a transmission rate of 6×500 k=3 megabit/second is achieved. Due to TCM, each direction sends data in slightly less than half the time; hence the averaged data rate in this case is slightly below 1.5 megabit/second, which is much higher than ISDN. Higher effective data rates than ISDN are achieved by the more advanced techniques (such as CAP or DMT) used by TCM-DSL.

TX filter 104 shapes the transmitted pulses and places the transmitted signal into the desired frequency band. The output of TX filter 104 typically has a higher sampling rate. Buffer 106 stores the filtered samples for transmission. D/A converter 45 converts the samples to analog signals which go through hybrid 91 and drive the telephone line through the POTS splitter.

Burst Timing

At the CO, burst timing control 98 receives clock 56 from the central office TCM-ISDN burst-timing control circuit, or from extracting burst timing from an ISDN line signal. At the customer side, clock 56 is derived from the transmit burst received from the CO. Burst clock 56 identifies when the transmit and receive windows 22, 28 occur for the ISDN cards at the CO. In one embodiment, the burst clock is a near-50%-duty cycle clock having a period equal to the total of the transmit and receive windows 22,28 and the turn-around time (a total of 2.5 milliseconds). When burst clock 56 is low, the transmit window 22 is indicated, while the high phase of burst clock 56 indicates the receive window 28. The falling edge of burst clock 56 signals modem transmitter 90 to transmit a frame of data for 1.178 milliseconds, while the rising edge of burst clock 56 signals modem receiver 92 to receive a frame of data. Since the data frames are of fixed length, bit or symbol counters can be used to end transmission or reception of the bursts of data.

Figure 12:
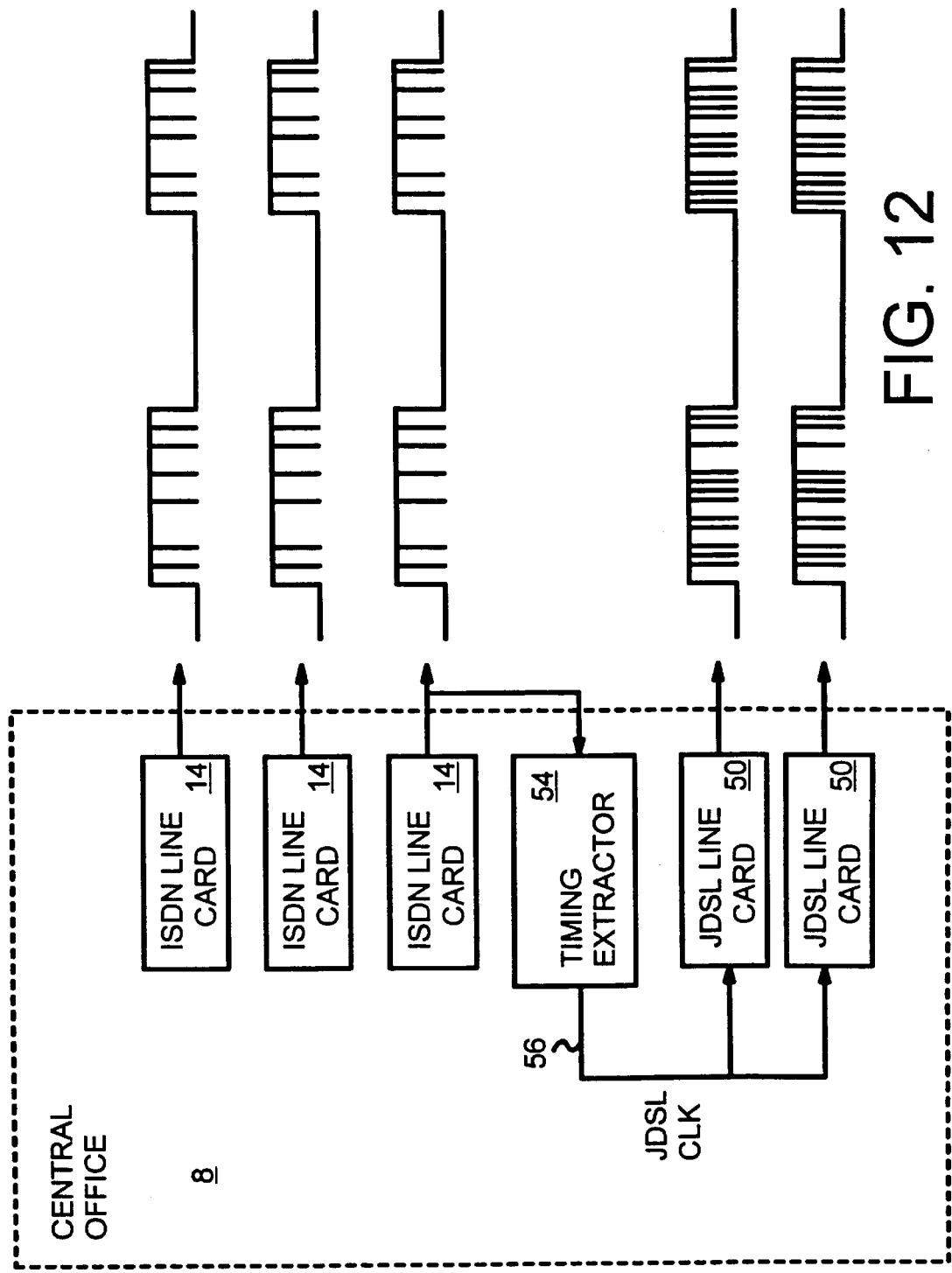
FIG. 12 is a diagram of a TCM-DSL line card that extracts the TCM timing of ISDN lines.

Extracting ISDN Timing—FIG. 12

FIG. 12 is a diagram of a TCM-DSL line card that extracts the TCM timing of ISDN lines. Often, TCM-DSL line cards can get the TCM timing clock directly from TCM-ISDN burst timing circuit. In cases where a clock source for TCM-ISDN timing is not directly available, TCM timing can be extracted from the ISDN line signal or the NEXT from one or more of the TCM-ISDN line signals by timing extractor 54.

The timing extractor in FIG. 12, is functionally a modified TCM-ISDN CPE modem. The input to timing extractor 54 is connected to an ISDN line card's output. Timing extractor 54 detects the beginning of the burst of data transmitted by detecting the start-frame sequences of the ISDN signal This is useful when the ISDN line cards are mounted on a separate rack or even in a separate room or building from the TCM-DSL line cards. If TCM-ISDN is not installed in the same cable bundle, a TCM burst control circuit can be installed to generate the burst-timing clock for TCM-DSL modems.

Timing extractor 54 generates burst clock 56 that is sent to TCM-DSL line card 50, and to other TCM-DSL line cards 50 at central office 8.

The input to timing extractor 54 may be connected to the TCM-DSL line signal rather than the ISDN line signal. The timing extractor then senses when interference from ISDN lines in the same cable bundle is occurring and adjusts its TCM timing accordingly. The transmit timing of the ISDN modems can be detected by measuring the level of interference on the TCM-DSL line. The interference during the CO transmit time will be higher since this interference is caused by NEXT which is typically much higher than FEXT. To make this measurement, the CO modem and the CPE modem should not be transmitting. Once the correct transmit time has been found, normal operation can begin.

To maintain the correct transmit time, silent periods can be inserted periodically to check the interference measurement. If an 8 KHz network clock is available, it can be used by timing extractor 54. The ISDN transmit burst timing always maintains the same timing relationship to the 8 KHz network clock. For example, the 8 KHz network clock can be divided by 20 to get the burst timing clock of a frequency 400 Hz. Timing extractor 54 can generate the 400 Hz clock the same way. The frequency of these two 400 Hz clocks will be the same. Timing extractor 54 only has to lock the relative phase of these two 400 Hz clocks. This is achieved by comparing the phase of the TCM-DSL burst clock with the phase of the detected burst clock from the ISDN line signal or from the interference from the ISDN lines.

Sensing ISDN Timing by Interference

As an alternative to the above method the TCM-DSL line cards in the CO sense the TCM-ISDN timing by measuring the cross-talk induced on their lines. This can be accomplished by introducing a silent period in the modem training. During this silent period the amount of cross-talk is measured. If TCM-ISDN lines are in the same bundle, the CO TCM-ISDN transmit time is marked by an increased level in the measured cross-talk.

To maintain the correct transmit time during normal operation, silent periods can be inserted periodically to check the interference measurement. In such a scheme as part of training all CO modems may make the cross-talk measurement together. One modem may then be chosen to act as the timing master for all the others. This method has the benefit of redundancy. If no modems detect cross-talk, it can be assumed that TCM-ISDN interference is not a problem and one modem can be chosen to be the timing master in a free running mode.

Figure 13:
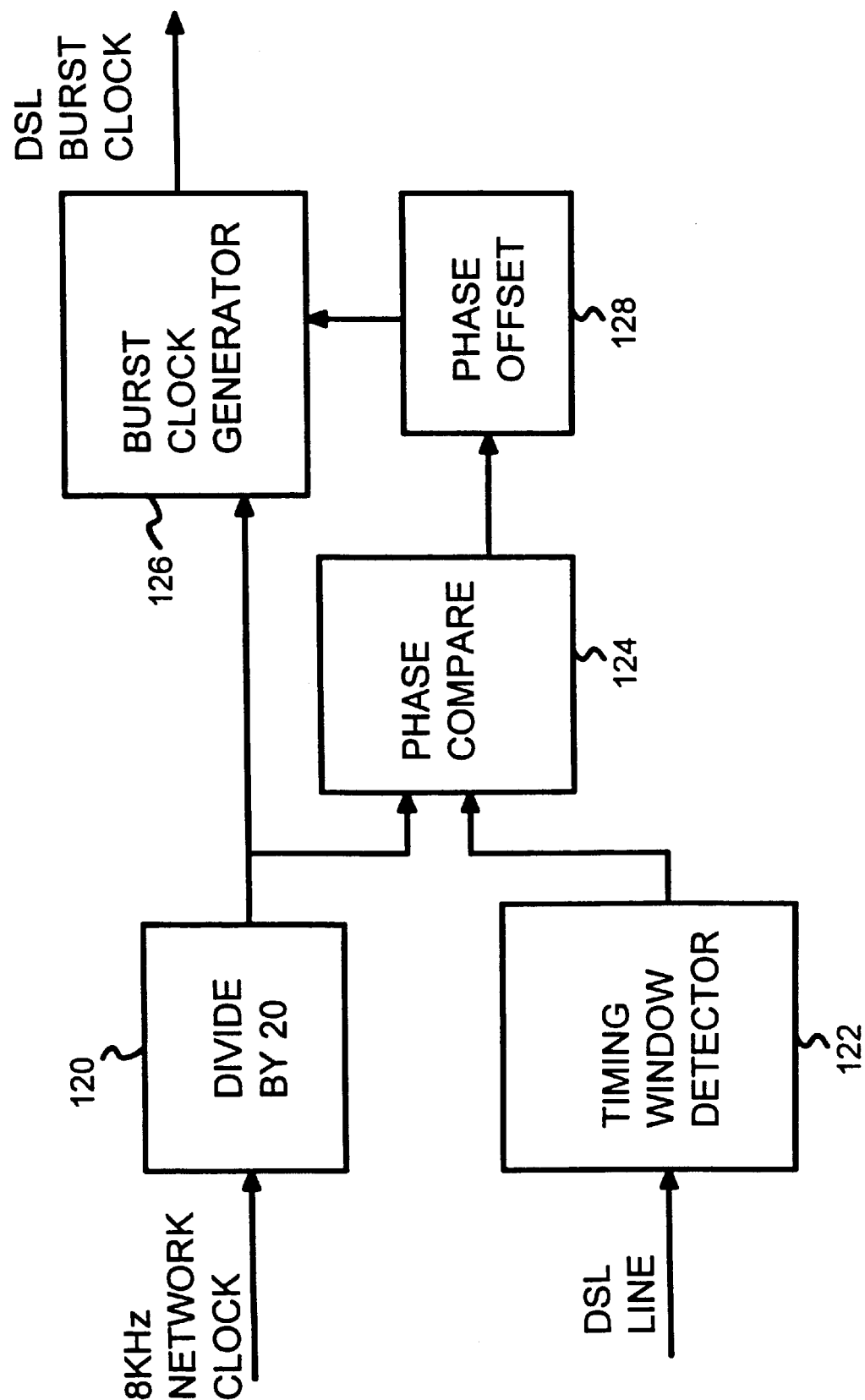
FIG. 13 shows an alternative embodiment for sensing crosstalk interference during normal operation and using an 8 KHz network clock.

Sensing and Storing ISDN Timing—FIG. 13

FIG. 13 shows an alternative embodiment for sensing cross-talk interference during normal operation and using an 8 KHz network clock. An 8 KHz network clock is divided by divider 120 to produce a 400 Hz clock (2.5 ms period). This 400 Hz clock is exactly the same frequency as the TCM-ISDN burst clock, but has an arbitrary phase difference. Timing extractor 122 measures the level of interference on the copper line as part of the training sequence. From the level of this interference the downstream transmit window of the TCM-ISDN modems can be determined. This will be the 1.178 ms window showing the highest level of interference. The phase difference between the 400 Hz clock and the measured downstream TCM-ISDN timing window is measured by phase comparator 124, and recorded as phase offset 128. This recorded phase offset 128 is then used during modem operation by burst clock generator 126 to generate the DSL downstream timing window. This ensures that the DSL downstream window and the TCM-ISDN downstream window remain in phase.

Figure 14:
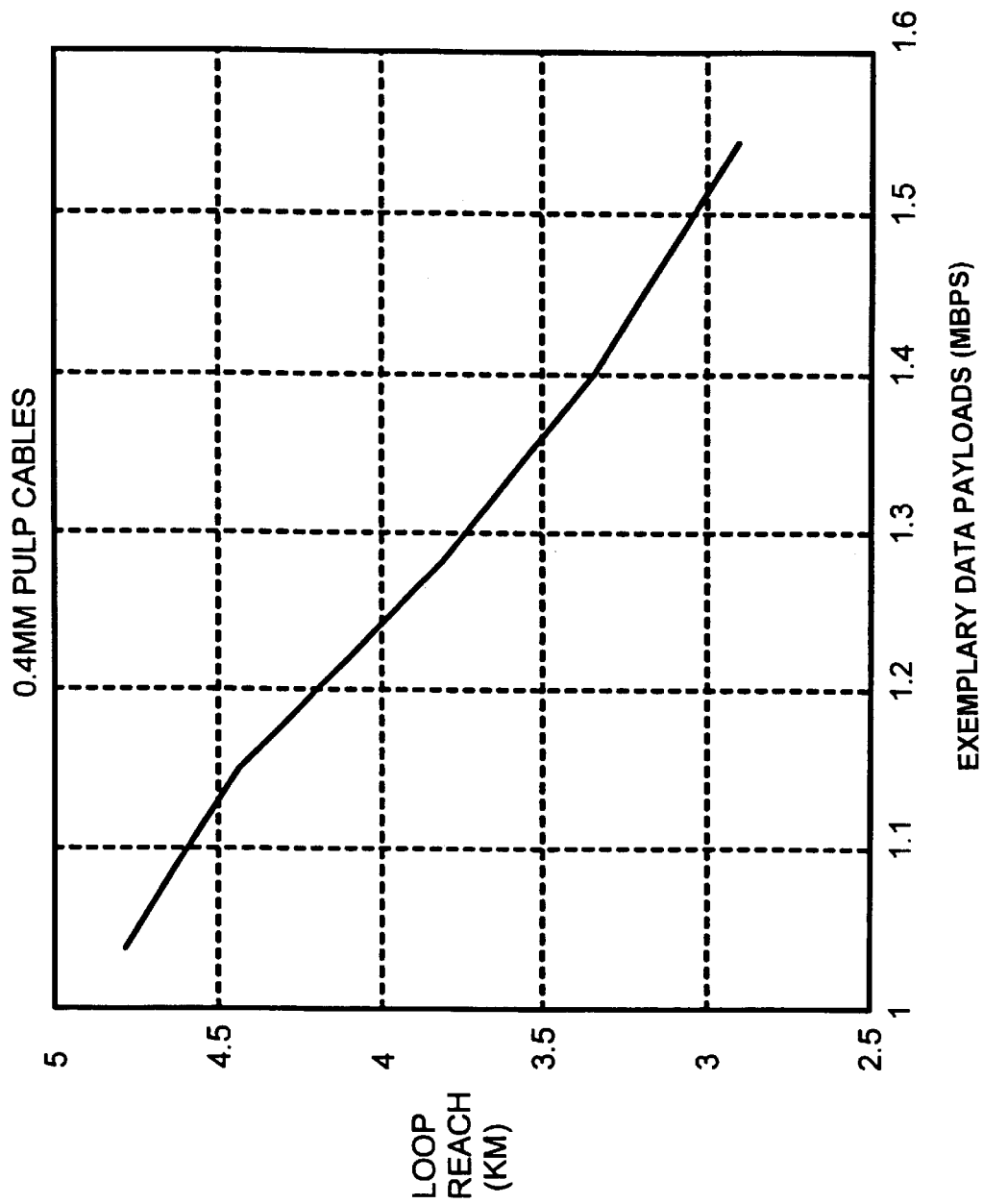
FIG. 14 is a graph of exemplary data rates achievable for TCM-DSL synchronized to TCM-ISDN for various telephone-line lengths.

High Data Rates with Pulp Cables—FIG. 14

FIG. 14 is a graph of exemplary data rates achievable for TCM-DSL synchronized to TCM-ISDN for various telephone-line lengths. The effect of cross-talk from ISDN and other TCM-DSL lines is significantly reduced, allowing higher data rates to be achieved with poorly-insulated 0.4-mm pulp cables. For example, simulations show that a 3 km-long pulp telephone line can achieve a 1.5 Mbps data rate using TCM-DSL. This is an astonishingly high rate for such a poor cable. Data rates over 1 Mbps are still achievable for lines as long as 4.5 km. This loop length reaches over 99% of the customers in Japan.

Synchronizing TCM-DSL timing to TCM-ISDN eliminates the effect of NEXT cross-talk to and from ISDN and other TCM-DSL services in the same cable bundle, even when high-cross-talk pulp cables are used and the ISDN transmitted signal is poorly filtered. Thus higher-performance xDSL equipment can co-exist with noisy existing lines and transmit data at about ten times the rate of older ISDN equipment by using CAP or DMT modulation and other advanced signal processing techniques, such as Trellis code modulation and pre-coding.

The TCM-DSL system can therefore be added to an existing phone system is in countries such as Japan where TCM-ISDN is used. High-bandwidth TCM-DSL is achieved even with inferior pulp cables. Existing TCM-ISDN lines can co-exist with TCM-DSL lines in a common cable bundle. Interference from existing ISDN lines is reduced for lines in a cable converted to higher-bandwidth TCM-DSL lines. Japan and other countries with pulp cables or time-compression-multiplexed ISDN lines can benefit from the invention.

Several other embodiments are contemplated by the inventors. Many circuit implementations are possible. While the invention has been described as mimicking the ISDN timing, the TCM-DSL timing can be adjusted somewhat, such as to expand the downstream window relative to upstream window, when there is no TCM-ISDN in the same cable bundle. This would provide asymmetric data rates by increasing the download bandwidth at the expense of the upload bandwidth.

The frequency range of the TCM-DSL pass-band can be varied. The frequency bandwidth can be reduced for lower data rates and/or for shorter telephone lines. While the term "line card" has been used, it is apparent that the functions described for the line card could reside on a printed-circuit-board substrate, a metal or ceramic substrate, or on other modular systems such as racks or boxes. The functions of the line card can be arranged on multiple substrates or integrated onto one or more silicon semiconductor chips.

Processing of the TCM-DSL and POTS data streams can occur in parallel, either by using two separate processors in the DSP, or with time-sharing of a fast DSP. A large analog driver with enough drive for the phone line is also normally added to the analog output of the D/A converter. Various signal processing techniques, such as Trellis encoding/Viterbi decoding and pre-coding/pre-emphasis can be used in the encoder/decoder, or not used in cost-sensitive applications. Instead of CAP modulation, QAM modulation or other pass-band modulation techniques can be used.

Figure 15:
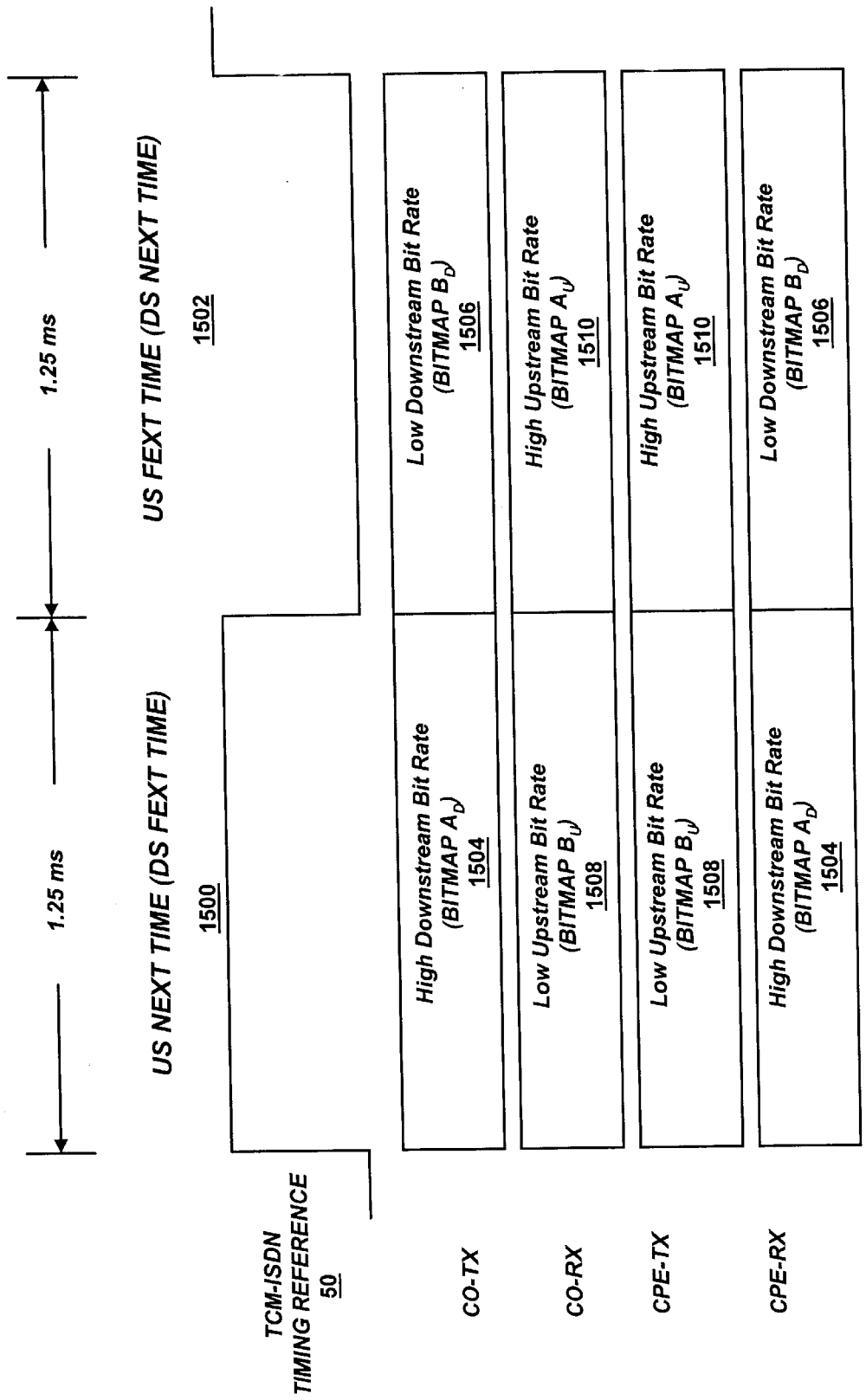
FIG. 15 is a diagram illustrating full-duplex xDSL data transmission under NEXT and FEXT interference.

Full-duplex xDSL Data Transmission—FIG. 15

Figure 1:
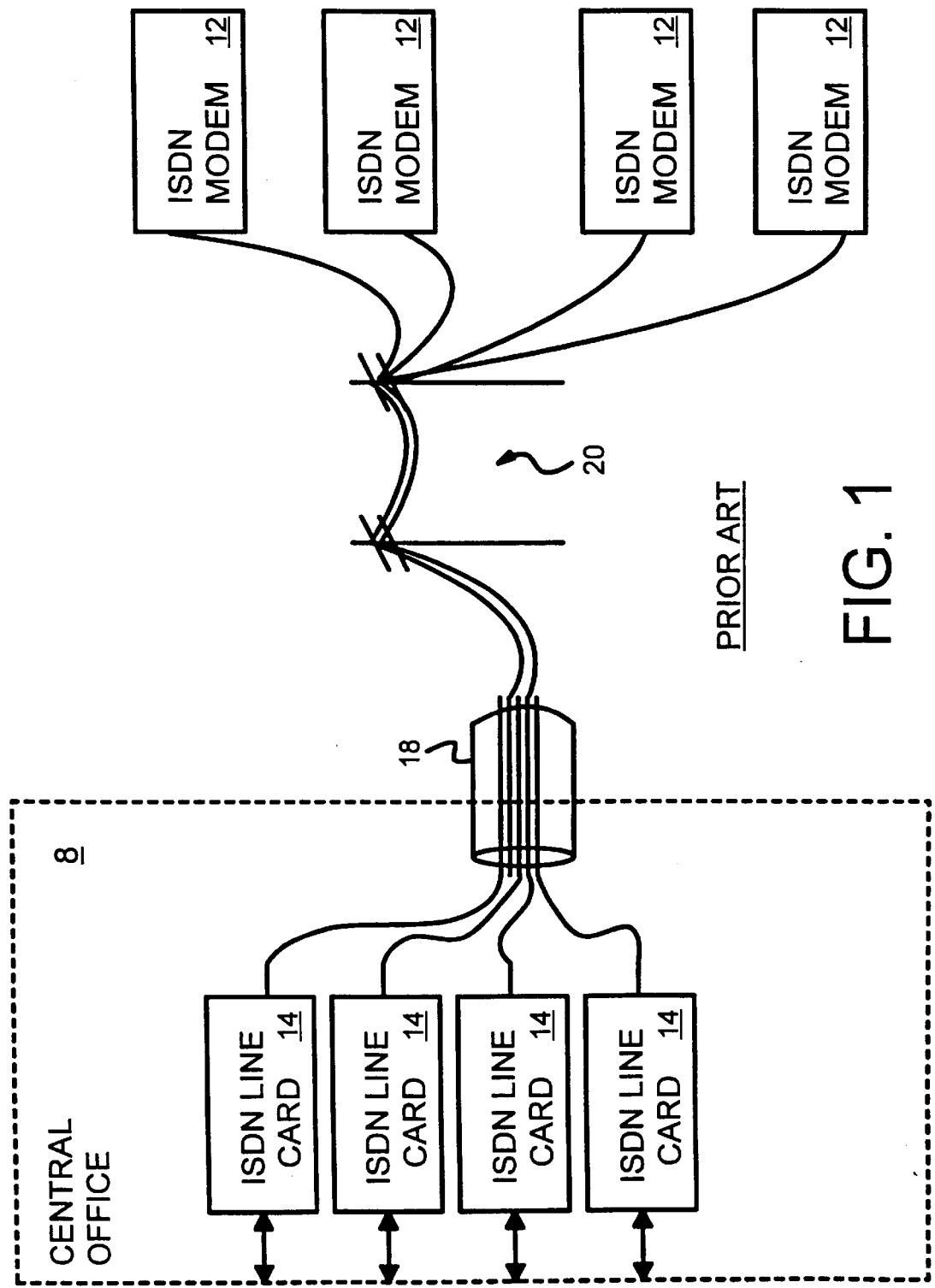
FIG. 1 shows the problem of interference from existing ISDN lines.
Figure 2:
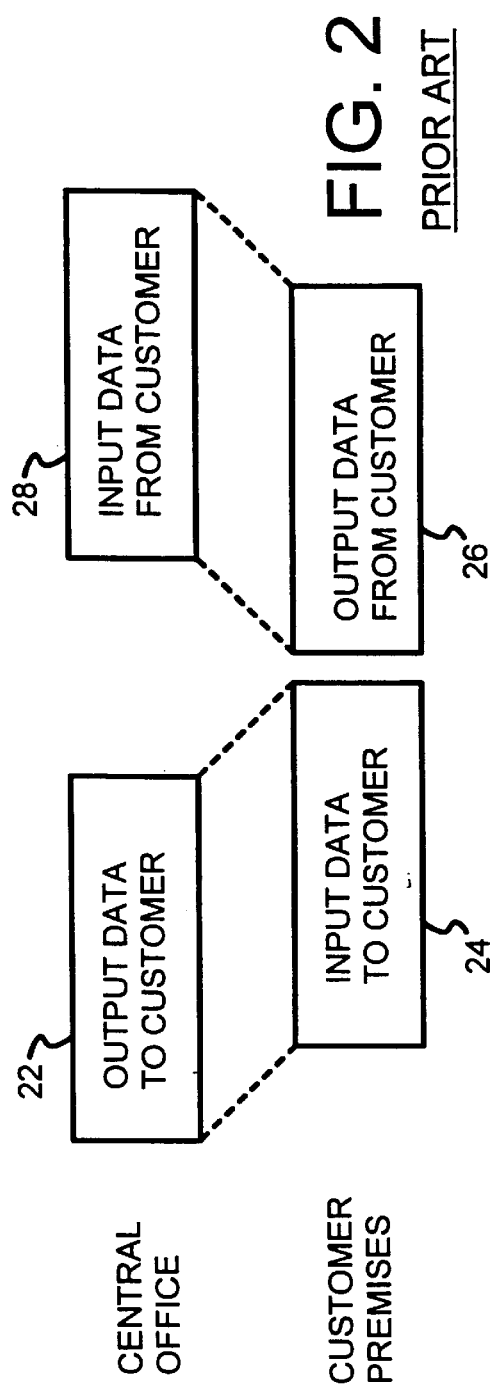
FIG. 2 is a timing diagram for a TCM-ISDN line.
Figure 3:
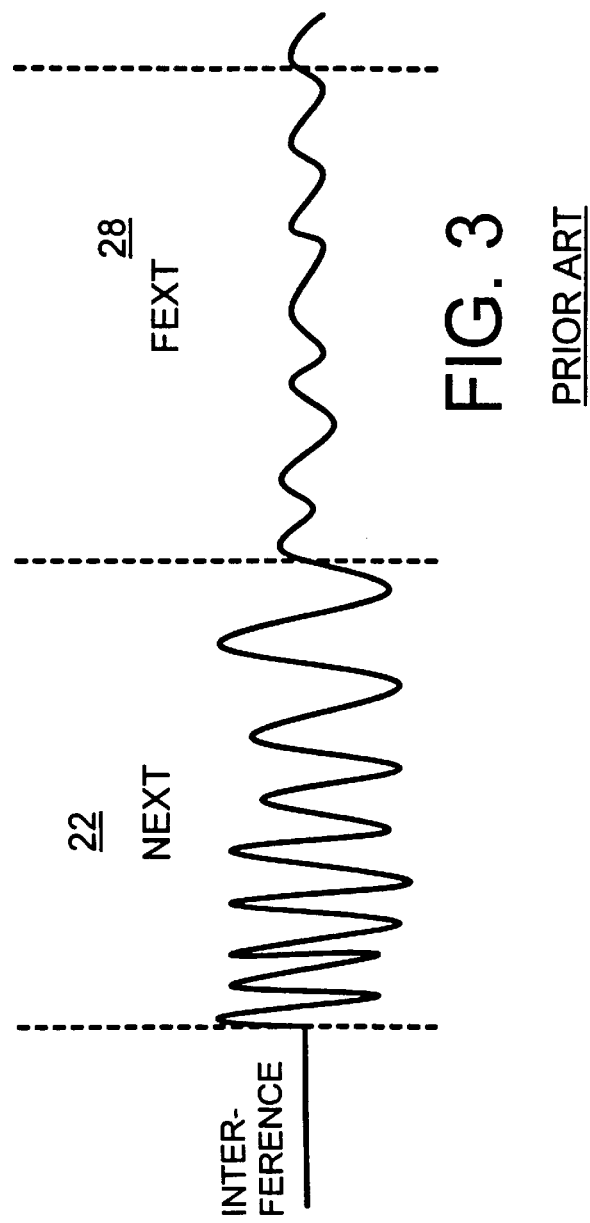
FIG. 3 is a diagram of interference at a central office from several ISDN lines transmitting in synchronization.

Referring to FIG. 15, there is shown a diagram illustrating full-duplex xDSL data communication under NEXT and FEXT interference. A TCM-ISDN timing reference is divided into a US NEXT time (DS FEXT time) 1500 portion and a US FEXT time (DS NEXT time) 1502 portion, as previously described with respect to FIG. 3. The CO modem 47 and the CPE modem 48 communicating in a TCM-ISDN environment each receive NEXT interference and FEXT interference alternately in the cycle of 400 Hz. During 1500, FEXT interference affects ADSL data sent from the CO modem 47 to the CPE modem 48, and NEXT interference affects ADSL data sent from CPE modem 48 to CO modem 47. Similarly, during 1502, NEXT interference affects ADSL data sent from the CO modem 47 to the CPE modem 48, FEXT interference affects ADSL data sent from CPE modem 48 to CO modem 47.

During time 1500, a CO modem 47 transmits data at a downstream bit rate 1504 and receives data at an upstream bit rate 1508, wherein the upstream bit rate 1508 may be significantly lower than the upstream bit rate 1510. During this same time period, a CPE modem 48 transmits data at the upstream bit rate 1508 and receives data at the downstream bit rate 1504. During time 1502, the CO modem 47 transmits data at the downstream bit rate 1506 and receives data at the upstream bit rate 1510, wherein the downstream bit rate 1506 may be significantly lower than the downstream bit rate 1504. During this same time period, the CPE modem 48 transmits data at the upstream bit rate 1510 and receives data at the downstream bit rate 1506.

In FIG. 15, Bitmap A provides a higher data rate than Bitmap B by encoding with more bits per symbol than Bitmap B. Thus, in time 1500 the CO modem 47 transmits data encoded with Bitmap AD and receives data encoded with Bitmap $B_U$. During this same time period, the CPE modem 48 transmits data encoded with Bitmap $B_u$ and receives data encoded with Bitmap $A_D$.

Similarly, during time 1502, the CO modem 47 transmits data encoded with Bitmap $B_D$ and receives data encoded with Bitmap $A_U$. During this same time period, the CPE modem 48 transmits data encoded with Bitmap $A_D$ and receives data encoded with Bitmap $B_U$.

While operating in a DBM mode, problems can occur during modem transceiver training. If the transceiver in CPE modem 48 is operating in a full-duplex mode, the echo signal from the its own transmitter is added to the remote signal transmitted by the CO modem 47. This combined signal is often stronger than the remote signal received from CO modem 47 by itself. To accommodate the combined signal, the CPE modem 48 needs to adjust the gain and dynamic range of its receiver. Moreover, the CPE modem 48 receiver typically needs to employ an echo filter or echo canceller to remove the unwanted echo signal generated by the transmitter.

By contrast, when operating in a SBM mode the echo signal and the remote signal are not processed by the CPE modem 48 receiver at the same time. At any particular time, one end of the TCM-ISDN line is transmitting, while the other end is receiving (e.g., half-duplex). Therefore, neither gain adjustment for echo, nor echo filter is needed in the SBM mode.

During initialization, the CPE modem 48 does not know if it will be using the SBM or DBM mode until after transceiver training. Therefore, its receiver must allocate additional dynamic range for the echo signal in case the DBM mode is selected. This added dynamic range is wasted if the SBM mode is selected instead of the DBM mode. Further, since the echo signal and the remote signal are not processed at the same time during training, the dynamic range of the CPE modem 48 receiver cannot be preset to accommodate the combined signal. Thus, if the training signal used in the SBM mode is half-duplex, the transceiver training will not be optimized for full-duplex data communication in DBM mode, and vice-versa.

For TCM-DSL modems to transmit and receive data properly, it is important to initially train the modems correctly. According to ITU-T draft recommendations G.992.1 and G.992.2 (Oct. 12–23, 1998, TD44 & TD45, Geneva), initialization includes the following four phases: (1) initial handshaking based on G.944; (2) transceiver training; (3) channel measurement; and (4) message exchange. In the current versions of G.992.1 and G.992.2, the transceiver training is done in half-duplex mode; namely, all the training signals are sent only in FEXT time. At the end of the transceiver training, the CO modem 47 informs the CPE modem 48 whether DBM or SBM will be used.

The present invention described below improves data communication by selecting the DBM/SBM mode prior to transceiver training to properly configure the modem for the type of data communication expected (e.g., full-duplex, half-duplex).

Figure 16:
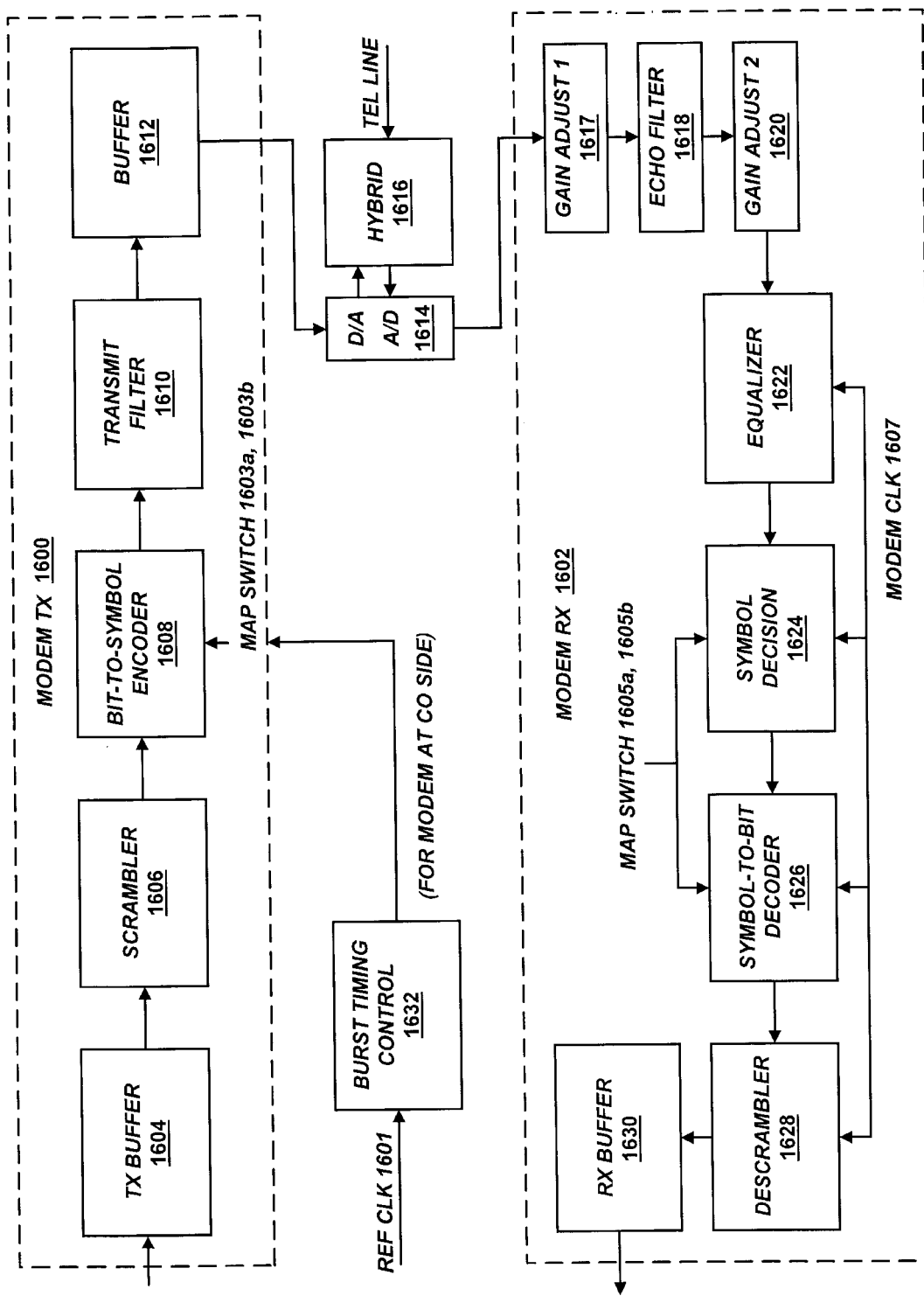
FIG. 16 is a functional block diagram of one embodiment of a TCM-DSL modem for optimizing transceiver training in accordance with the present invention.

Referring to FIG. 16, there is shown a functional block diagram of one embodiment of a TCM-DSL modem for optimizing transceiver training in accordance with the present invention. This modem can be either a CO modem 47 or a CPE modem 48. A CO modem 47 is shown in FIG. 16.

The CO modem 47 includes a transmitter 1600 and a receiver 1602. The transmitter 1600 includes a transmit buffer 1604, a scrambler 1606, a bit-to-symbol encoder 1608, a transmit filter 1610, and a buffer 1612. The buffer 1612 is coupled to an analog front-end 1614, which includes digital-to-analog (D/A) and analog-to-digital (A/D) converters. The analog front-end 1614 is coupled to a hybrid circuit 1616, which functions as previously described with respect to FIG. 11.

Data ready for transmission is received from the customer's data terminal equipment or the telephone network's data pathways and buffered by the transmit buffer 1604. The transmit buffer 1604 is used to maintain a continuous data stream while the TCM-DSL modem bursts data using time compression.

The scrambler 1606 operates on the input data bits to randomize the data pattern. The bit-to-symbol encoder 1608 receives sequences of bits from the transmit buffer 1604 and encodes them as symbols using predetermined signal constellations.

The transmit filter 1610 shapes the transmitted pulses and places the transmitted signal into the desired frequency band. The buffer 1612 stores the filtered samples for transmission. The D/A converter converts the samples to analog signals, which are coupled to the telephone line via the hybrid circuit 1616.

The bit-to-symbol encoder 1608 is coupled to a map switch 1603 for switching between bitmaps, as described with respect to FIG. 15. If operating in the DBM mode, the map switch 1603 is used to select one of two possible bitmaps for symbol encoding (e.g., Bitmap A or Bitmap B). For the CO modem 47, the map switch 1603 is derived from the reference clock 1601 shown in FIG. 16.

For example, the falling edge of the reference clock 1601 provides a first map switch 1603 state for selecting a first bitmap for encoding. Similarly, the rising edge of the reference clock 1601 provides a second map switch 1603 state for selecting a second bitmap for encoding. The map switch state is derived from the reference clock 1601. The map switch 1603 is switched synchronized with TCM-ISDN timing.

In a preferred embodiment, a CO TX map switch 1603a is synchronized to the reference clock 1601. A CPE RX map switch 1605a is synchronized to the CO TX map switch 1603a. The sync can be achieved through, for example, a map switch training signal transmitted at the beginning of transceiver training.

A CPE TX map switch 1603b is synchronized to the CPE RX map switch 1605a. A CO RX switch 1605b is synchronized to the CO TX map switch 1603a. Since the CPE TX map switch 1603b is in sync with the CPE RX map switch 1605a, which is in sync with the CO TX map switch 1603a, the CO RX switch 1605b is in sync with the CPE TX map switch 1603b. The match switch training signal can be, for example, a phase change of a tone signal transmitted from the CO modem 47, wherein the phase change is synchronized to the reference clock 1601.

For the CO modem 47, the reference clock 1601 can be derived, for example, from the transmit burst received from the CO, or alternatively, the match switch 1603 state is derived from an ISDN line signal, as previously described with respect to FIG. 12.

The modem receiver 1602 includes an echo filter 1618, gain adjust blocks 1617 and 1620, an equalizer 1622, a symbol decision block 1624, a symbol-to-bit decoder 1626, a descrambler 1628, and a receiver buffer 1630. For the DBM mode of operation, the CO modem 47 operates in full-duplex mode. During full-duplex operation, an echo signal from the modem transmitter 1600 is added to the signal received from a CPE modem 48. This echo signal is often stronger than the remote signal. Before the echo signal can be removed from the remote signal by the echo filter 1618, a large dynamic range is reserved by the modem receiver 1602 for receiving the combined echo signal plus remote signal, which sometimes reduces the performance of the modem receiver 1602, if its dynamic range is limited. Therefore, the modem receiver 1602 adjusts its gain and dynamic range using the gain adjust blocks 1617, 1620 to accommodate the combined signal.

The echo filter 1618 described above typically has some transition band (e.g., guard band) between upstream and downstream channels. The guard band takes up bandwidth that could otherwise be used for data transmission. In SBM, the echo filters can be removed, thereby freeing up additional bandwidth for data communication. Thus, by knowing the mode prior to transceiver training, the modem receiver can be optimally configured to provide additional bandwidth for data transmission, which is normally reserved as guard bands for the echo filters.

The functions of the digital equalizer 1622, the symbol decision block 1624, the symbol-to-bit decoder 1626, the descrambler 1628, and the receive buffer 1630 have already been described with respect to FIG. 11, except for a map switch 1605 coupled to the symbol-to-bit decoder 1626 and the symbol decision block 1624. Like the map switch 1603 in the modem transmitter 1600, the map switch 1605 in the receiver 1602 is used to select between bitmaps during symbol decision and symbol-to-bit decoding.

The CO modem 47 described above optimizes its transceiver training based on prior knowledge of the SBM/DBM mode selection. If SBM is selected, the modem can totally ignore the echo signal from its own transmitter 1600, and train its receiver 1602 based on the remote signal only. If DBM is selected, the modem can adjust the receiver gain to account for the echo signal and train the receiver 1602 in the presence of the echo signal. In a preferred embodiment, the REVERB1 signal described in Annex C is used for gain adjustment. For SBM, the gain is adjusted for half-duplex communication, and REVERB1 is transmitted only in FEXT symbols. For DBM, the gain is adjusted for full-duplex communication, and REVERB1 is transmitted in both NEXT and FEXT symbols. NEXT and FEXT symbols are transmitted during NEXT and FEXT times, respectively. To determine how to transmit REVERB1, a code point can be added to the ITU-T draft recommendation G.994.1 (October, 1998) for indicating the mode selection. The ITU-T draft recommendation G.994.1 is incorporated by reference herein in its entirety.

Figure 17:
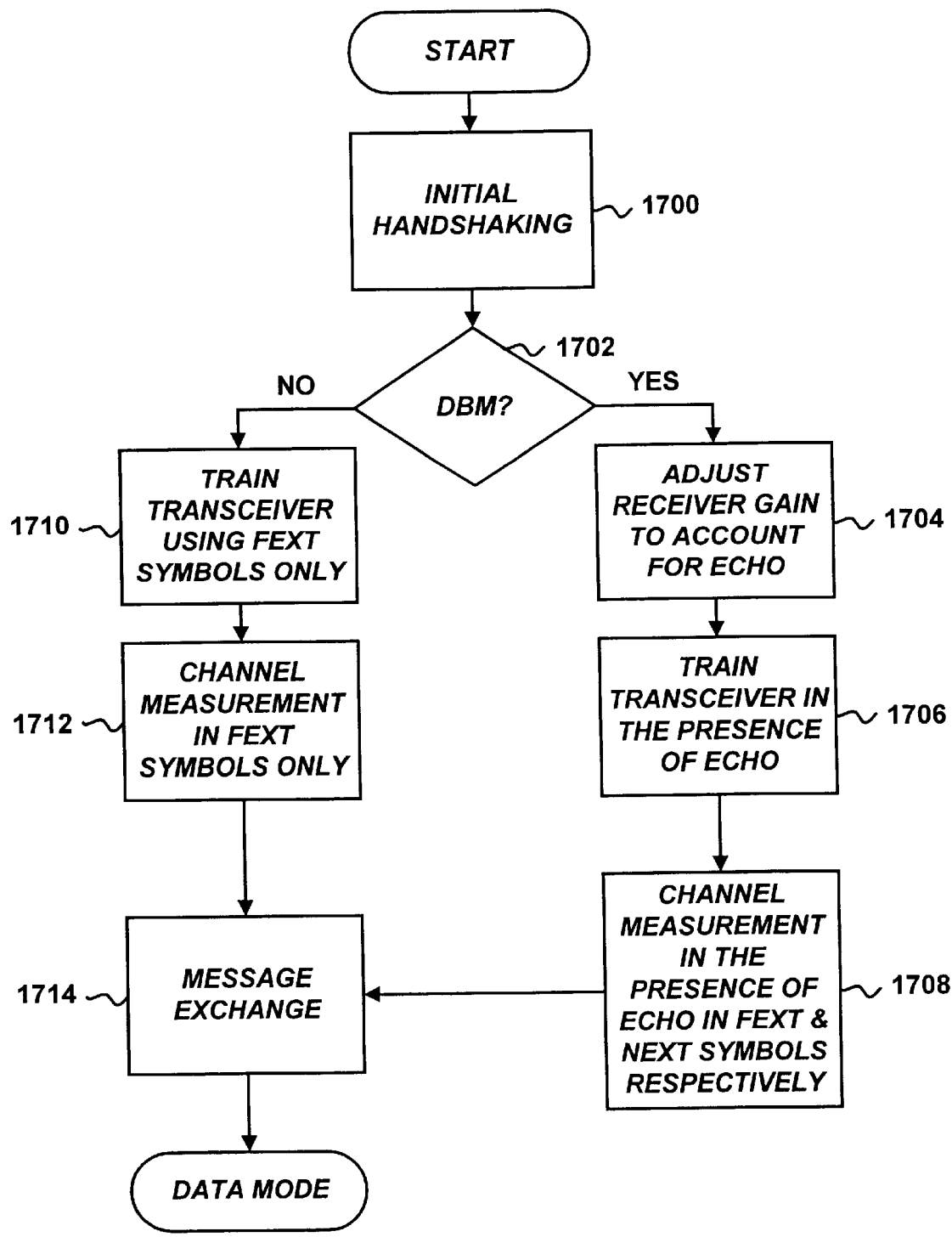
FIG. 17 is a flow diagram illustrating a method of optimizing transceiver training for the TCM-DSL modem in FIG. 16 in accordance with the present invention.

Referring to FIG. 17, there is shown a flow diagram of a method of optimizing transceiver training for a TCM-DSL modem in accordance with the present invention. During the initial handshaking phase 1700 (see, e.g., G.994), the CPE modem 48 transceiver receives a mode signal from the CO modem 47 indicating the selection of either DBM or SBM.

If the mode signal indicates 1702 that DBM has been selected, the CPE modem 48 will: (1) adjust 1704 its receiver gain to account for echo; (2) train 1706 the transceiver in the presence of the echo; (3) take channel measurements 1708 in the presence of the echo in FEXT and NEXT symbols, respectively; (4) exchange 1714 one or more messages; and (5) proceed to a data mode, thereby completing the initialization process.

While the above description refers to the CPE modem 48, it is noted that the CO modem 47 also adjusts its dynamic range and/or configuration when using DBM.

If the mode signal indicates 1702 that SBM has been selected, the CPE modem 48 will: (1) train 1710 the transceiver using FEXT symbols; (2) take channel measurements 1712 in FEXT symbols only; (3) exchange 1714 one or more messages; and (5) proceed to the data mode, thereby completing the initialization process.

An advantage of the present invention is that it allows a TCM-DSL modem transceiver to optimize its training and configuration based on an earlier knowledge of the SBM/DBM mode selection.

For SBM, a wider frequency bandwidth may be used for data transmission. For example, if SBM is selected, the modem can ignore the echo from its own transmitter and train its receiver based on the remote signal only. The echo is often much stronger than the remote signal. Before the echo is removed from the remote signal, a large dynamic range is reserved for the echo, which may reduce the receiver's performance if the modem's dynamic range is limited. On the other hand, if DBM is selected, the transceiver training is optimized by adjusting the dynamic range of the receiver to account for echo and designing the training signals for full-duplex operation.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of training modems for Digital Subscriber Line (DSL) systems under Time Compression Multiplexing-Integrated Services Digital Network (TCM-ISDN) interference, comprising the steps of:
   exchanging between a first modem and a second modem a mode selection prior to transceiver training;
   providing full-duplex communication between the first and second modems if a first mode is selected, the first mode corresponding to a Dual Bitmap (DBM); and
   providing half-duplex communication between the first and second modems if a second mode is selected, the second mode corresponding to a Single Bitmap (SBM).

2. The method of claim 1, further including the step of:
   adjusting at least one of the modems based on the mode selected.

3. The method of claim 2, wherein each modem has a transmit frequency bandwidth and a receive frequency bandwidth, and the step of adjusting at least one of the modems includes the step of:
   adjusting at least one of the transmit and receive frequency bandwidths of at least one of the modems.

4. The method of claim 2, wherein each modem has a receiver gain, and the step of adjusting at least one of the modems includes the step of:
   adjusting the receiver gain of at least one of the modems.

5. The method of claim 1, wherein the transceiver training occurs in the presence of echo if the first mode is selected and training occurs in the absence of echo if the second mode is selected.

6. The method of claim 1, further comprising the steps of:
   transmitting at least one training signal between the first and second modems in near-end, cross-talk (NEXT) symbols and far-end, cross-talk (FEXT) symbols if the first mode is selected; and
   transmitting at least one training signal between the first and second modems in FEXT symbols if the second mode is selected.

7. The method of claim 6, further comprising the steps of:
   measuring at least one communication channel in FEXT and NEXT symbols, respectively, if the first mode is selected.

8. The method of claim 6, further comprising the steps of:
   measuring at least one communication channel in FEXT symbols if the second mode is selected.

9. The method of claim 1, further including the steps of:
   providing at least one map switch signal to at least one of the modems for selecting among a plurality of bitmaps for encoding; and
   encoding data with the selected bitmap.

10. The method of claim 1, further including the step of:
    providing at least one map switch signal to at least one of the modems for selecting among a plurality of bitmaps for decoding; and
    decoding data with the selected bitmap.

11. The method of claim 1, wherein the step of exchanging occurs during initial handshaking.

12. The method of claim 1, wherein each modem has a receiver gain, and the step of adjusting at least one of the modems includes the step of:
    adjusting the receiver gain of at least one of the modems using a training signal.

13. The method of claim 1, wherein a code point is used to exchange the mode selection between the first modem and the second modem prior to transceiver training.

14. A system for training modem transceivers for Digital Subscriber Line (DSL) systems under Time Compression Multiplexing-Integrated Services Digital Network (TCM-ISDN) interference, comprising:
    a first modem coupled to a telephone line, the first modem having an encoder for encoding data;
    a first map switch coupled to the encoder for selecting at least one of a plurality of bitmaps for encoding based on a mode selected prior to transceiver training, the selected mode from a group of modes consisting of Dual Bitmap (DBM) and Single Bitmap (SBM);
    a second modem coupled to the telephone line, the second modem having a decoder for decoding data transmitted by the first modem; and a second map switch coupled to the decoder for selecting at least one of the plurality of bitmaps for decoding based on the mode selected prior to transceiver training.

15. The system of claim 14, wherein at least one modem includes:

at least one gain adjust circuit responsive to the mode selected.

16. The system of claim 14, wherein at least one modem includes:

an echo filter responsive to the mode selected.

17. The system of claim 16, wherein the echo filter is not used if the Single Bitmap mode is selected.

18. The system of claim 14, wherein an amount of available frequency bandwidth for data transmission is increased if the Single Bitmap second mode is selected.

19. The system of claim 14, wherein the encoder of the first modem, the decoder of the second modern, and the first and second map switches are implemented in one or more processors.

20. The system of claim 14, wherein at least one map switch is a phase change of a tone signal synchronized to a reference clock.

21. The system of claim 14, wherein at least one map switch is switched synchronized with TCM-ISDN timing.

22. A method of training a Digital Subscriber Line (DSL) transceiver in the presence of Time Compression Multiplexing-Integrated Services Digital Network (TCM-ISDN) interference, the method comprising:

receiving a mode selection before transceiver training, the mode selection indicating full-duplex or half-duplex operation of the DSL transceiver;

if the mode selection indicates half-duplex operation, training the DSL transceiver using a first set of one or more bitmaps for encoding and decoding, the first set of bitmaps corresponding to a single bitmap (SBM); and if the mode selection indicates full-duplex operation, training the DSL transceiver using a second set of one or more bitmaps for encoding and decoding, the second set different from the first set.

23. The method of claim 22, wherein the mode selection is received during an initial handshaking period.

24. The method of claim 22, wherein the method further comprises:

training the DSL transceiver using FEXT symbols only if the mode selection indicates half-duplex operation.

25. The method of claim 24, further comprising:

measuring channel signal-to-noise ratio using FEXT symbols only.

26. The method of claim 24, further comprising:

disabling an echo filter in a receiver portion of the DSL transceiver.

27. The method of claim 22, wherein the second set of one or more bitmaps corresponds to a dual bitmap (DBM), and the method further comprises:

adjusting a gain value for a receiver portion of the DSL transceiver to account for an echo signal from a transmitter portion of the DSL transceiver; and training the DSL transceiver in the presence of echo.

28. The method of claim 27, further comprising:

adjusting a dynamic range for the receiver portion of the DSL transceiver to account for an echo signal from the transmitter portion.

29. The method of claim 27, further comprising:

in the receiver portion of the DSL transceiver, filtering the echo signal from the transmitter portion.

30. The method of claim 27, further comprising:

measuring channel signal-to-noise ratio. for FEXT and NEXT symbols.

31. A method of training modems for Digital Subscriber Line (DSL) systems under Time Compression Multiplexing-Integrated Services Digital Network (TCM-ISDN) interference, comprising:

exchanging a selected mode between a first modem and a second modem prior to transceiver training, each modem having a transmit frequency bandwidth and a receive frequency bandwidth;

adjusting at least one of the transmit and receive frequency bandwidths of at least one of the modems based on the mode selected;

providing full-duplex communication between the first and second modems if a first mode is selected; and providing half-duplex communication between the first and second modems if a second mode is selected.

32. A system for training modem transceivers for Digital Subscriber Line (DSL) systems under Time Compression Multiplexing-Integrated Services Digital Network (TCM-ISDN) interference, comprising:

a first modem coupled to a telephone line, the first modem having an encoder for encoding data;

a first map switch coupled to the encoder for selecting at least one of a plurality of bitmaps for encoding based on a mode selected prior to transceiver training;

a second modem coupled to the telephone line, the second modem having a decoder for decoding data transmitted by the first modem; and a second map switch coupled to the decoder for selecting at least one of the plurality of bitmaps for decoding based on the mode selected prior to transceiver training, wherein an amount of available frequency bandwidth for data transmission is increased if a second mode is selected relative to an amount of available frequency bandwidth for data transmission if a first mode is selected.

* * * * *

UNITED STATES PATENT AND TRADEMARK OFFICE
CERTIFICATE OF CORRECTION

PATENT NO. : 6,804,267 B1
DATED : October 12, 2004
INVENTOR(S) : Guozhu Long and Yaron Bar-Ness It is certified that error appears in the above-identified patent and that said Letters Patent is hereby corrected as shown below:

Column 19,
Line 16, please delete "second" from the claim.

Signed and Sealed this

Eighteenth Day of January, 2005

JON W. DUDAS
*Director of the United States Patent and Trademark Office*